US012620313B2

(12) United States Patent
Matsuzaki et al.

(10) Patent No.: US 12,620,313 B2
(45) Date of Patent: May 5, 2026

(54) PROCESSING METHOD, PROCESSING SYSTEM, AND STORAGE MEDIUM STORING PROCESSING PROGRAM

(71) Applicant: DENSO CORPORATION, Kariya-city (JP)

(72) Inventors: Hidenori Matsuzaki, Kariya-city (JP); Hirotoshi Yasuoka, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 63 days.

(21) Appl. No.: 18/472,928

(22) Filed: Sep. 22, 2023

(65) Prior Publication Data

US 2024/0013659 A1     Jan. 11, 2024

Related U.S. Application Data

(63) Continuation of application No. PCT/JP2022/006438, filed on Feb. 17, 2022.

(30) Foreign Application Priority Data

Mar. 26, 2021     (JP) ................................. 2021-053969

(51) Int. Cl.
*G08G 1/16*          (2006.01)
*B60W 30/095*     (2012.01)

(52) U.S. Cl.
CPC ............... *G08G 1/16* (2013.01); *G08G 1/166* (2013.01); *B60W 30/095* (2013.01); *B60W 30/0953* (2013.01); *B60W 30/0956* (2013.01)

(58) Field of Classification Search
CPC ............ G08G 1/00; G08G 1/005; G08G 1/01; G08G 1/017; G08G 1/095; G08G 1/16;
(Continued)

(56) References Cited

U.S. PATENT DOCUMENTS 11,834,042 B2 * 12/2023 Satti ..................... G06N 3/0464
2017/0018187 A1 * 1/2017 Kim ....................... G08G 1/005
(Continued)

FOREIGN PATENT DOCUMENTS

JP          H10-250510 A          9/1998
JP          2009-059200 A          3/2009
(Continued)

OTHER PUBLICATIONS

U.S. Appl. No. 18/472,945 and its entire file history.

*Primary Examiner* — Van T Trieu
(74) *Attorney, Agent, or Firm* — Precision Patents, P.C.

(57)          ABSTRACT

A processing method is executed by a processor for performing a process related to a driving control of a host moving object that is configured to communicate with a target moving object. The processing method includes: acquiring warning information from the target moving object, the warning information warning of an envelope violation that is a violation of a safety envelope in which a safety of an intended functionality is set, the safety envelope being set for the target moving object with respect to the host moving object; and adjusting the safety envelope with respect to the target moving object in response to acquiring the warning information.

9 Claims, 18 Drawing Sheets

(58) Field of Classification Search
CPC ........ G08G 1/164; G08G 1/166; G08G 1/167;
G08G 1/0967; H04W 76/23; H04W
76/043; H04L 67/12; B60W 30/095;
B60W 30/0953; B60W 30/0956; B60W
30/14; B60W 30/143; B60W 60/00
See application file for complete search history.

(56) References Cited

U.S. PATENT DOCUMENTS

| | | | | |
|---|---|---|---|---|
| 2019/0206254 A1* | 7/2019 | Tao | ................... | B60W 30/0956 |
| 2019/0291727 A1 | 9/2019 | Shalev-Shwartz et al. | | |
| 2019/0295179 A1 | 9/2019 | Shalev-Shwartz et al. | | |
| 2019/0299983 A1 | 10/2019 | Shalev-Shwartz et al. | | |
| 2019/0329768 A1 | 10/2019 | Shalev-Shwartz et al. | | |
| 2019/0329769 A1 | 10/2019 | Shalev-Shwartz et al. | | |
| 2019/0329773 A1 | 10/2019 | Shalev-Shwartz et al. | | |
| 2019/0329782 A1 | 10/2019 | Shalev-Shwartz et al. | | |
| 2019/0329783 A1 | 10/2019 | Shalev-Shwartz et al. | | |
| 2019/0333381 A1 | 10/2019 | Shalev-Shwartz et al. | | |
| 2021/0110483 A1 | 4/2021 | Shalev-Shwartz et al. | | |
| 2021/0110484 A1 | 4/2021 | Shalev-Shwartz et al. | | |
| 2021/0142421 A1 | 5/2021 | Shalev-Shwartz et al. | | |
| 2021/0166325 A1 | 6/2021 | Shalev-Shwartz et al. | | |
| 2021/0269021 A1 | 9/2021 | Shalev-Shwartz et al. | | |
| 2022/0363248 A1 | 11/2022 | Shalev-Shwartz et al. | | |

FOREIGN PATENT DOCUMENTS

| | | |
|---|---|---|
| JP | 2002-168640 A | 6/2022 |
| WO | 2020/035728 A2 | 2/2020 |

* cited by examiner

FIG. 1

| Terms | Description |
|---|---|
| Levels of driving automation | Levels of driving automation may be defined as "mutually exclusive set of driving automation levels, ranging from Level 0 (no automation) to Level 5 (full automation), defining the roles of the driver or user and automation system in relation to each other". |
| Operational design domain (ODD) | Operational design domain may be defined as "specific conditions under which a given driving automation system is designed to function". Operational design domain may be defined as "operating conditions under which a given automated driving system or feature thereof is specifically designed to function, including, but not limited to, environmental, geographical, and time-of-day restrictions, and/or the requisite presence or absence of certain traffic or roadway characteristics". |
| Dynamic driving task (DDT) | Dynamic driving task may be defined as "real-time operational and tactical functions required to operate a vehicle in traffic". Dynamic driving task may be defined as "all of the real-time operational and tactical functions required to operate a vehicle in on-road traffic". |
| Takeover | Takeover may be define as "transfer of the driving task between the automated driving system and the driver". |
| Lagging measure | Lagging measure may be defined as "metrics that are assessed after deployment of an automated driving system and provides confirmation that the positive risk balance as well as conformance with the safety-by-design techniques have been achieved". Lagging measure may be defined as "metrics that are assessed after deployment of an automated driving system and provides confirmation that conformance with the safety-by-design has been achieved". Herein, safety may be defined with consideration of statistics or social acceptability other than absolute metrics. |
| Leading measure | Leading measure may be defined as "metrics that are derived from data that is assessed prior to deployment of an automated driving system indicating that the automated driving system conforms with safety-by-design techniques to achieve a positive risk balance and avoidance of unreasonable risk". Leading measure may be defined as "metrics that are derived from data that is assessed prior to deployment of an automated driving system indicating that the automated driving system conforms with safety-by-design to achieve avoidance of unreasonable risk". Herein, safety may be defined with consideration of statistics or social acceptability other than absolute metrics. |

FIG. 2

| Terms | Description |
|---|---|
| High definition map (HD map) | High definition map may be defined as "maps with high level precision mostly used in the context of automated driving system to give the vehicle precise information about the road environment". |
| Path planning | Path planning may be defined as "identification and selection of the vehicle trajectory for every defined time-step in response to the situational awareness, destination and other constraints". |
| Operational design domain (ODD) | Operational design domain may be defined as "specific conditions under which a given driving automation system is designed to function". Operational design domain may be defined as "operating conditions under which a given automated driving system or feature thereof is specifically designed to function, including, but not limited to, environmental, geographical, and time-of-day restrictions, and/or the requisite presence or absence of certain traffic or roadway characteristics". |
| Scenario | Scenario may be defined as "description of the temporal relationship between several scenes, with goals and values within a specified situation in a sequence of scenes influenced by actions and events". Scenario may be defined as "description of the consecutive time series of activities integrating the subject vehicle, all its external environment and their interactions in the process of performing a certain driving task". Scenario may be defined as "high level descriptions of common driving situations in which reasonable and foreseeable assumptions about the behavior of other road users shall be made". |
| Scene | Scene may be defined as "snapshot of the environment including the scenery, dynamic elements, and all actors and observers self-representations, and the relationships among those entities". Scene may be defined as "snapshot of the scenario at a given point of time". |
| Use case | Use case may be defined as "description of a suite of related scenarios". |
| Simulation | Simulation may be defined as "approximated imitation of selected behavioral characteristics of one physical or abstract system by a static or dynamic model". |

FIG. 3

| Terms | Description |
|---|---|
| Driving policy (DP) | Driving policy may be defined as "strategy and rules defining acceptable control actions at vehicle level". Driving policy may be decision-making level implementation of the vehicle level safety strategy (VLSS). Driving policy may be a mapping from a sensing state (a description of the world around us) into a driving command (e.g., the command is lateral and longitudinal accelerations for the coming second, which determines where and at what speed should the car be in one second from now). |
| Vehicle level safety strategy (VLSS) | VLSS may represent the set of requirements for the function under development used to support SOTIF related design, verification and validation activities. VLSS may be the overarching specification that ensure the overall AV safety. |
| Safety of the Intended functionality (SOTIF) | SOTIF may be defined as "absence of unreasonable risk due to these potentially hazardous behaviors related to such limitations". SOTIF may be defined as "absence of unreasonable risk due to hazards resulting from functional insufficiencies of the intended functionality or its implementation". SOTIF may be defined as "absence of unreasonable risk due to hazards resulting from functional insufficiencies of the intended functionality or by reasonably foreseeable misuse by road users". |
| Proper response | Proper response may be defined as "the set of corrective actions that the driving policy might require to maintain the SOTIF of an autonomous vehicle (AV) during nominal conditions". |
| Unreasonable risk | Unreasonable risk may be defined as "risk judged to be unacceptable in a certain context according to valid societal moral concepts". |
| Unreasonable situation | Unreasonable situation may be defined as "a situation where some other agent is not behaving reasonably per the assumptions used in the model". |
| Misuse | Misuse may be defined as "usage of the system by a human in a way not intended by the manufacturer or the service provider". |

FIG. 4

| Terms | Description |
|---|---|
| Safety envelope | The definition of a "safety envelope" may be a common concept that can be used to address all the principles that the driving policy might comply with. According to this concept, the autonomous vehicle might have one or more boundaries around the ego-vehicle, where the violation of one or more of these boundaries result in different responses by the autonomous vehicle.<br>Safety envelopes may define a physics based margin around the automated vehicle typically combined with defined assumptions about the reasonably foreseeable worst case behavior of others to provide a foundational building block of a safety-related model.<br>Safety envelope may be the basic construct for understanding if the autonomous vehicle is in a high risk scenario.<br>Safety envelope may be defined to demarcate boundaries, margins or buffer areas not only around the ego-vehicle but also around other vehicles, around pedestrians or around stationary objects. |
| DDT fallback | DDT fallback may be defined as "response by the driver or automation system to either perform the DDT or transition to a minimal risk condition after the occurrence of a failure(s) or detection of a functional insufficiency or upon detection of a potentially hazardous behavior".<br>DDT fallback may be defined as "takeover/fallback condition and schemes of transition control from autonomous to control by driver or other system with their relevant use cases". |
| Minimal risk condition (MRC) | Minimal risk condition may be defined as "vehicle state in order to reduce the risk of a harm, when a given trip cannot be completed".<br>Minimal risk condition may be defined as "condition to which a user or an automated driving system may bring a vehicle after performing the minimal risk maneuver in order to reduce the risk of a crash when a given trip cannot be completed". |
| Minimal risk maneuver (MRM) | Minimal risk maneuver may be defined as "automated driving system's capability of transitioning the vehicle between nominal and minimal risk conditions". |
| Degradation | Degradation may be defined as "state or transition to a state of the item or element with reduced functionality, performance, or both". |

FIG. 5

| Terms | Description |
|---|---|
| user | User may be defined as "general term referencing the human role in driving automation". |
| Fallback ready user | Fallback ready user may be defined as "user who is able to operate the vehicle and is capable of intervening to perform the DDT fallback as required and within a time span appropriate for the defined non-driving occupation". |
| Road user | Road user may be defined as "anyone who uses a road including sidewalk and other adjacent spaces". Road users may include pedestrians, cyclists, other VRUs, and vehicles (for example, human driven motor vehicles or ADS-equipped vehicles). |
| Vulnerable road user (VRU) | Vulnerable road user may be defined as "non-protected road user such as motorcyclists, cyclists, pedestrians and persons with disabilities or reduced mobility and orientation". |
| Non vulnerable road user | Non vulnerable road user may be defined as "protected road users such as users in other vehicles, trucks, construction and agricultural machines". |
| Other road user | Other road user may be defined as "vulnerable and non-vulnerable road users with no role in the ego automated vehicle". |
| Response time | Response time may be defined as "the time it takes for a road user to initiate an appropriate response (e.g., braking/steering/accelerating/stopping) due to a specific stimulus in a given scenario" |

FIG. 16

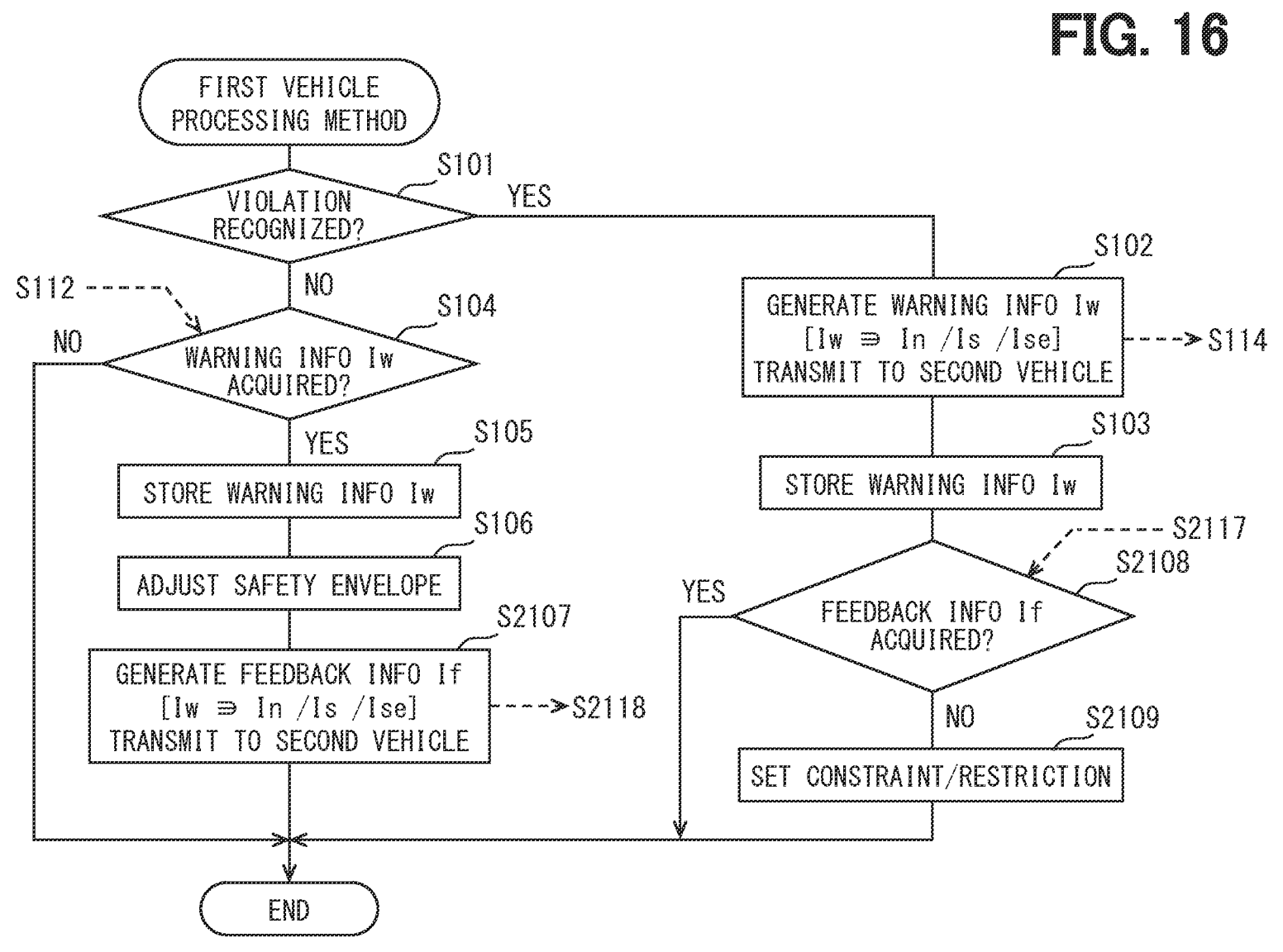

FIRST VEHICLE PROCESSING METHOD

S101 — VIOLATION RECOGNIZED?

NO →

S104 — WARNING INFO $I_w$ ACQUIRED?

S112 ---- NO

YES →

S105 — STORE WARNING INFO $I_w$

S106 — ADJUST SAFETY ENVELOPE

S2107 — GENERATE FEEDBACK INFO $I_f$ $[I_w \ni I_n /I_s /I_{se}]$ TRANSMIT TO SECOND VEHICLE ----→ S2118

YES (from S101) →

S102 — GENERATE WARNING INFO $I_w$ $[I_w \ni I_n /I_s /I_{se}]$ TRANSMIT TO SECOND VEHICLE ----→ S114

S103 — STORE WARNING INFO $I_w$

S2108 — FEEDBACK INFO $I_f$ ACQUIRED? ---- S2117

YES →

NO → S2109 — SET CONSTRAINT/RESTRICTION

END

PROCESSING METHOD, PROCESSING SYSTEM, AND STORAGE MEDIUM STORING PROCESSING PROGRAM

CROSS REFERENCE TO RELATED APPLICATIONS

This application is a continuation application of International Patent Application No. PCT/JP2022/006438 filed on Feb. 17, 2022, which designated the U.S. and claims the benefit of priority from Japanese Patent Application No. 2021-053969 filed on Mar. 26, 2021. The entire disclosure of all of the above application is incorporated herein by reference.

TECHNICAL FIELD

The present disclosure relates to a processing technique for performing processing related to driving of a moving object.

BACKGROUND ART

There has been known driving control related to a navigation operation of a host vehicle is planned according to detection information related to internal and external environments of the host vehicle. Therefore, when it is determined that there is potential accident responsibility based on a safety model following a driving policy and the detection information, a constraint is given to the driving control.

SUMMARY

One aspect of the present disclosure is a processing method executed by a processor for performing a process related to a driving control of a host moving object that is configured to communicate with a target moving object. The processing method includes: acquiring warning information from the target moving object, the warning information warning of an envelope violation that is a violation of a safety envelope in which a safety of an intended functionality is set, the safety envelope being set for the target moving object with respect to the host moving object; and adjusting the safety envelope with respect to the target moving object in response to acquiring the warning information.

BRIEF DESCRIPTION OF DRAWINGS

FIG. 1 is a table illustrating explanations of terms in the present disclosure.
FIG. 2 is a table illustrating explanations of terms in the present disclosure.
FIG. 3 is a table illustrating explanations of terms in the present disclosure.
FIG. 4 is a table illustrating explanations of terms in the present disclosure.
FIG. 5 is a table illustrating explanations of terms in the present disclosure.

FIG. 16 is a flowchart showing a processing method according to a second embodiment.
FIG. 20 is a block diagram showing a processing system according to a fifth embodiment.
FIG. 21 is a block diagram showing a processing system according to a sixth embodiment.

DESCRIPTION OF EMBODIMENTS

Figure 6:
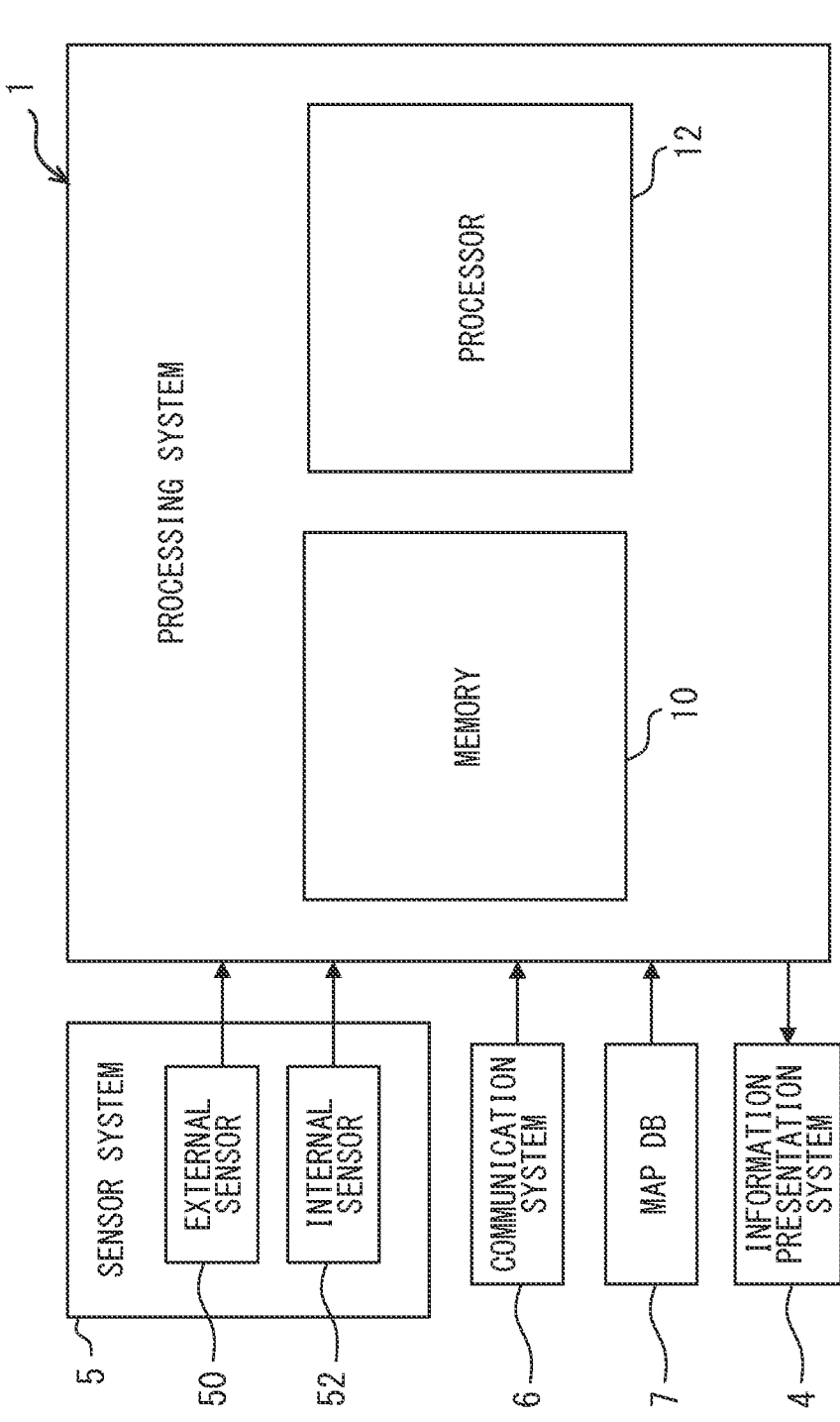
FIG. 6 is a block diagram illustrating a processing system according to a first embodiment.

To begin with, a relevant technology will be described only for understanding the following embodiments. However, there is a possibility that a discrepancy may occur in a situation recognition between the host vehicle and the target vehicle. Therefore, there is a possibility that the response to the behavior of the moving body may be affected.

One of objectives of the present disclosure is to provide a processing method that promotes improvement in ability to respond to the behavior of the moving body. Another one of objectives of the present disclosure is to provide a processing system that promotes improvement in ability to respond to the behavior of the moving body. Yet another one of objectives of the present disclosure is to provide a storage medium storing a processing nÏmedium that promotes improvement in ability to respond to the behavior of the moving body.

A first aspect of the present disclosure is a processing method executed by a processor for performing a process related to a driving control of a host moving object that is configured to communicate with a target moving object. The processing method includes: acquiring warning information from the target moving object, the warning information warning of an envelope violation that is a violation of a safety envelope in which a safety of an intended functionality is set, the safety envelope being set for the target moving object with respect to the host moving object; and adjusting the safety envelope with respect to the target moving object in response to acquiring the warning information.

A second aspect of the present disclosure is a processing system that is configured to execute a process related to a driving control for a host moving object that is configured to communicate with a target moving object. The system includes at least one processor programmed to: acquiring, from the target moving object, warning information for warning of an envelope violation that is a violation of a safety envelope in which a safety of an intended functionality is set, the safety envelope being set for the target moving object with respect to the host moving object; and adjust the safety envelope with respect to the target moving object in response to acquiring the warning information.

A third aspect of the present disclosure is a non-transitory, computer readable, tangible storage medium storing a processing program including instructions that cause at least one processor to execute a process related to a driving control of a host moving body that is configured to communicate with a target moving object. The instructions, when executed by the at least one processor, casing the at least one processor to: acquire, from the target moving object, warning information for warning of an envelope violation that is a violation of a safety envelope in which a safety of an intended functionality is set, the safety envelope being set for the target moving object with respect to the host moving object; and adjust the safety envelope with respect to the target moving object in response to acquiring the warning information.

In host moving objects according to first to third aspects, warning information for warning against an envelope violation that is a violation of a safety envelope in which safety of the intended functionality is set with respect to the host moving object in a target moving object is acquired from the target moving object. Therefore, in response to acquiring the warning information, in the host moving object, the safety envelope with respect to the target moving object is determined. Accordingly, since the envelope violation warned by the target moving object is commonly recognized by the host moving object and the recognized envelope violation can be considered when adjusting the safety envelope, it is possible to promote improvement of a response capability with respect to the behavior of the moving object.

A fourth aspect of the present disclosure is a processing method executed by a processor for performing a process related to a driving control of a host moving object that is configured to communicate with a target moving object. The processing method includes: monitoring an envelope violation that is a violation of a safety envelope in which a safety of an intended functionality is set, the safety envelope being set for the host moving object with respect to the target moving object; and generating a warning information for waning of the envelope violation to transmit the warning information to the target moving object when the host moving object recognizes the envelope violation.

A fifth aspect of the present disclosure is a processing system that is configured to execute a process related to a driving control for a host moving object that is configured to communicate with a target moving object. The system includes at least one processor programmed to: monitor an envelope violation that is a violation of a safety envelope in which a safety of an intended functionality is set, the safety envelope being set for the host moving object with respect to the target moving object; and generate a warning information for waning of the envelope violation to transmit the warning information to the target moving object when the host moving object recognizes the envelope violation.

A sixth aspect of the present disclosure is a non-transitory, computer readable, tangible storage medium storing a processing program including instructions that cause at least one processor to execute a process related to a driving control of a host moving body that is configured to communicate with a target moving object. The instructions, when executed by the at least one processor, case the at least one processor to: monitor an envelope violation that is a violation of a safety envelope in which a safety of an intended functionality is set, the safety envelope being set for the host moving object with respect to the target moving object; and generate a warning information for waning of the envelope violation to transmit the warning information to the target moving object when the host moving object recognizes the envelope violation.

In host moving objects according to the fourth to sixth aspects, an envelope violation that is a violation of a safety envelope in which safety of the intended functionality is set with respect to the target moving object is monitored. Therefore, when the envelope violation is recognized, the host moving object generates warning information for warning of the envelope violation to transmit the warning information to the target moving object Accordingly, since the envelope violation warned by the host moving object can be commonly recognized by the target moving object, it is possible to promote improvement of a response capability with respect to the moving object.

Next, multiple embodiments according to the present disclosure will be described with reference to the drawings. Duplicate description may be omitted by assigning the same reference numerals to corresponding configuration elements in each embodiment. When only a part of a configuration is described in each embodiment, configurations of the other embodiments described above can be applied to the other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular.

FIGS. 1 to 5 illustrate explanations of terms associated with each embodiment according to the present disclosure. However, definitions of the terms are not interpreted as being limited to the explanations illustrated in FIGS. 1 to 5, and are interpreted without departing from the gist of the present disclosure.

First Embodiment

A processing system 1 according to a first embodiment illustrated in FIG. 6 performs processing related to driving of a moving object (hereinafter, referred to as driving-related processing). The moving object subjected to the driving-related processing by the processing system 1 is a vehicle 2 illustrated in FIGS. 7 and 8. In the first embodiment, as the vehicle 2 to which the processing system 1 is applied, a first vehicle 2a and a second vehicle 2b that can communicate with each other directly or indirectly via a communication infrastructure are assumed. In a viewpoint of the first vehicle 2a illustrated in FIG. 7, the ego-vehicle 2a corresponds to a host moving object, and the second vehicle 2b, which is also another road user 3 present in a traveling environment of the ego-vehicle 2a, corresponds to a target moving object. On the other hand, in a viewpoint of the second vehicle 2b illustrated in FIG. 8, the ego-vehicle 2b corresponds to the host moving object, and the first vehicle 2a, which is also the other road user 3 present in a traveling environment of the ego-vehicle 2b, corresponds to the target moving object.

Figure 7:
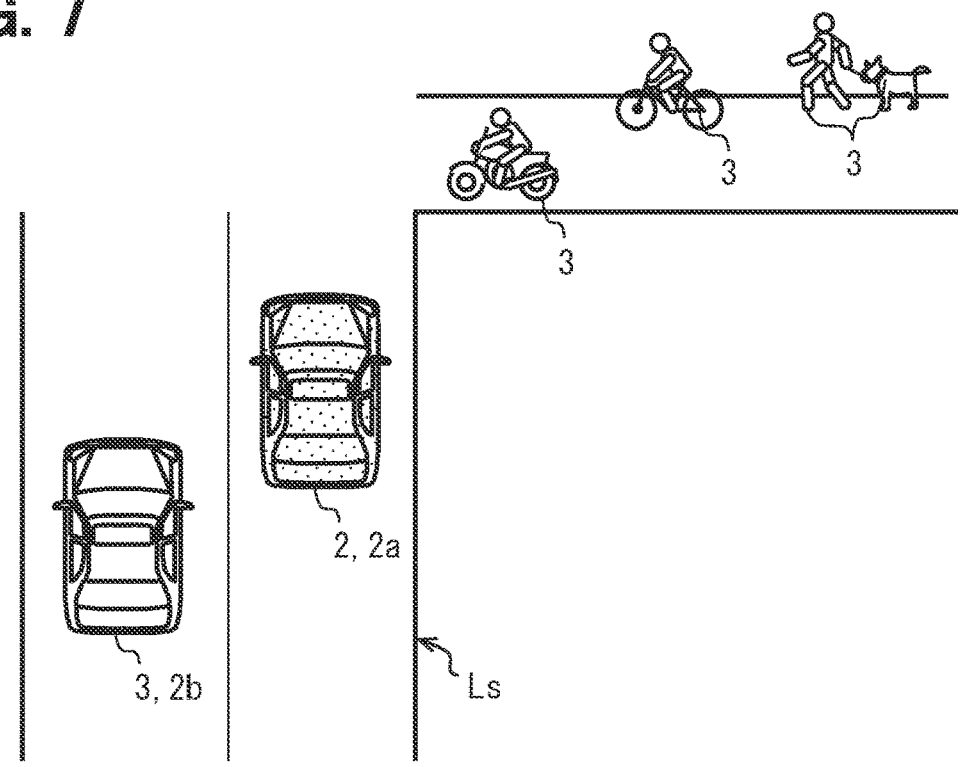
FIG. 7 is a schematic diagram illustrating a traveling environment of a host vehicle to which the first embodiment is applied.
Figure 8:
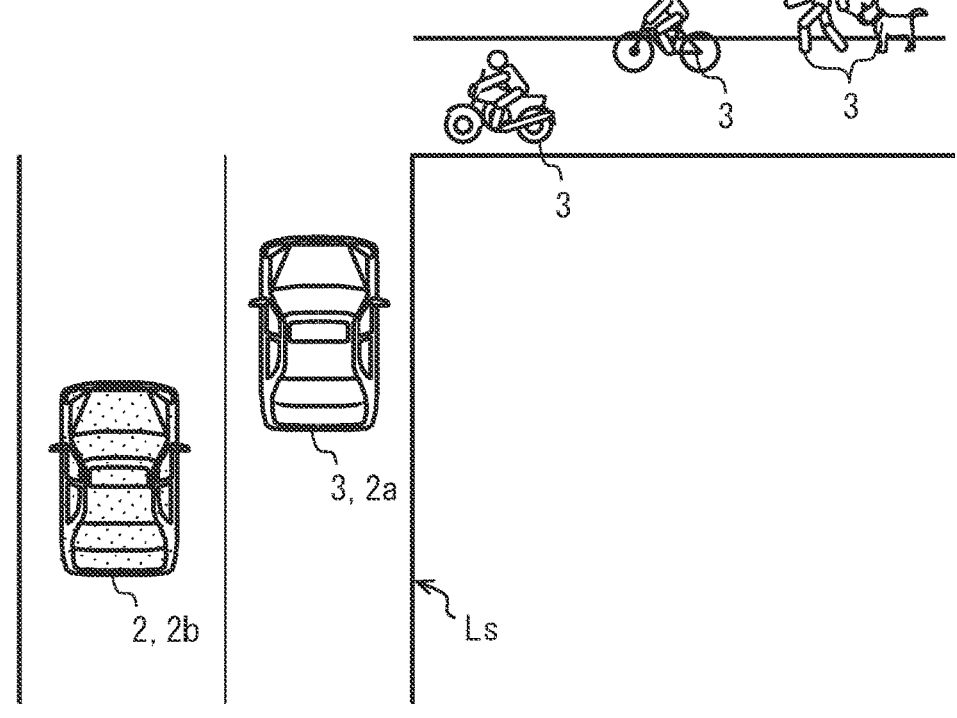
FIG. 8 is a schematic diagram illustrating a traveling environment of the host vehicle to which the first embodiment is applied.

The vehicle 2 illustrated in FIGS. 7 and 8 is a road user such as an automobile or a truck in which autonomous driving is executed. The autonomous driving is classified into levels according to the degree of manual intervention by an occupant in a dynamic driving task (hereinafter, referred to as DDT). The automated-driving may be achieved with an autonomous travel control, such as conditional driving automation, advanced driving automation, or full driving automation, where the system in operation performs all the DDTs. The automated-driving may be realized in advanced driving assistance control, such as driving assistance or partial driving automation, where the driver as a passenger performs some or all of the DDTs. The automated-driving may be realized by either one or combination of autonomous driving control and advanced driving assistance control or switching between the autonomous control and advanced driving assistance control.

Figure 9:
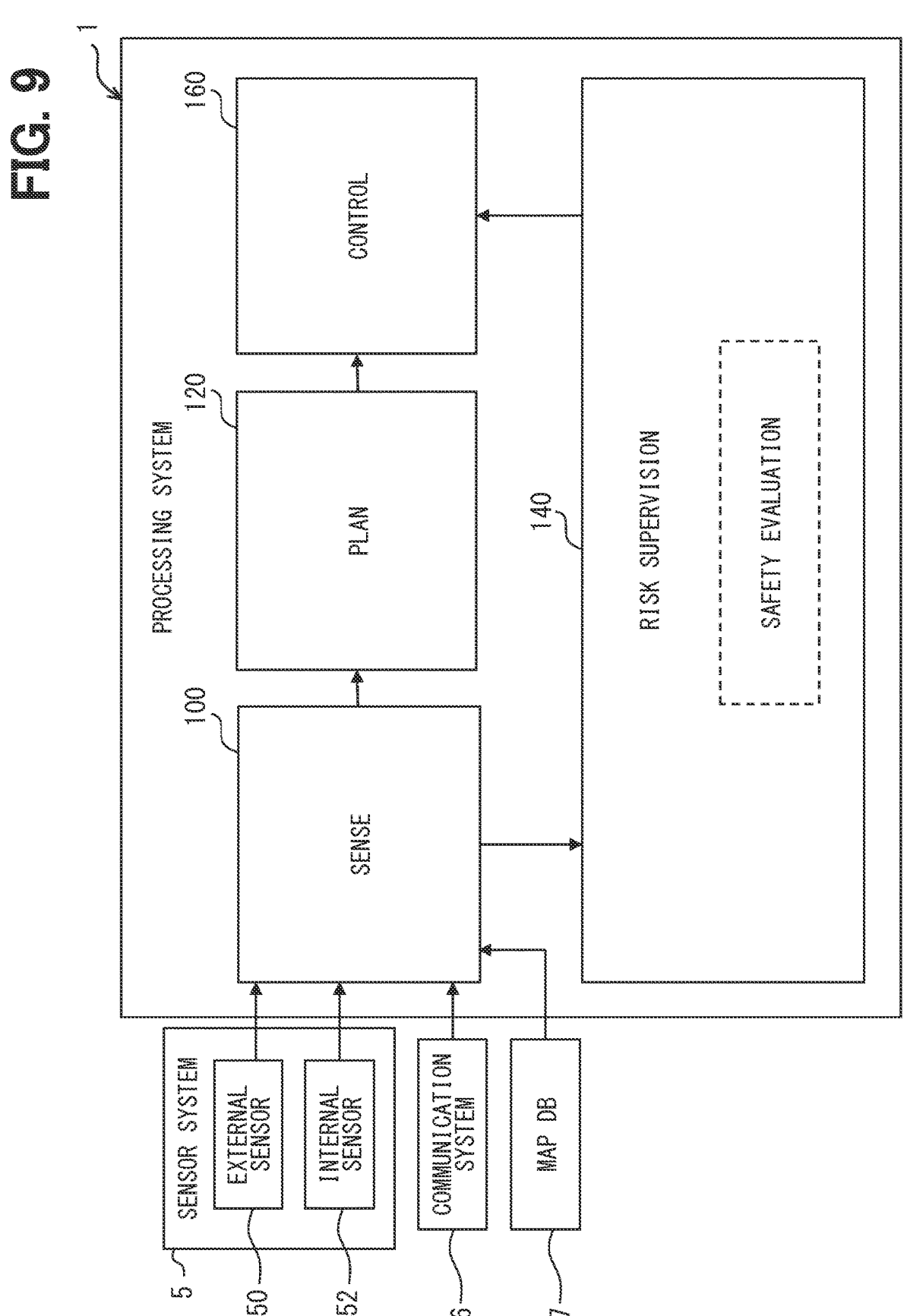
FIG. 9 is a block diagram illustrating the processing system according to the first embodiment.

A sensor system 5, a communication system 6, a map data base (DB) 7, and an information presentation system 4 illustrated in FIGS. 6 and 9 are mounted on the host vehicle 2. The sensor system 5 acquires sensor data that can be used by the processing system 1 by detecting an outside and an inside of the vehicle 2. Therefore, the sensor system 5 includes an external sensor 50 and an internal sensor 52.

The external sensor 50 may detect a target present in the outside of the vehicle 2. The target detection type external sensor 50 is at least one of, for example, a camera, a light detection and ranging/laser imaging detection and ranging (LIDAR), a laser radar, a millimeter wave radar, and an ultrasonic sonar. The external sensor 50 may detect a state of atmosphere in the outside of the vehicle 2. The atmosphere detection type external sensor 50 is at least one of, for example, an outside air temperature sensor and a humidity sensor.

The internal sensor 52 may detect specific physical quantities related to vehicle motion (hereinafter referred to as kinematic properties) in the inside of the vehicle 2. The physical quantity detection type internal sensor 52 is at least one of, for example, a speed sensor, an acceleration sensor, and a gyro sensor. The internal sensor 52 may detect a state of an occupant in the inside of the host vehicle 2. The occupant detection type internal sensor 52 is, for example, at least one of an actuator sensor, a driver status monitor, a biological sensor, a seating sensor, and an in-vehicle device sensor. In particular, as the actuator sensor, at least one of, for example, an accelerator sensor, a brake sensor, and a steering sensor that detect an operating state of an occupant related to a motion actuator of the host vehicle 2 is used.

The communication system 6 acquires communication data that can be used by the processing system 1 by wireless communication. The communication system 6 may receive a positioning signal from an artificial satellite of a global navigation satellite system (GNSS) present in the outside of the vehicle 2. The positioning type communication system 6 is, for example, a GNSS receiver. The communication system 6 may transmit and receive a communication signal to and from a V2X system present in the outside of the host vehicle 2. The V2X type communication system 6 is at least one of, for example, a dedicated short range communications (DSRC) communication device and a cellular V2X (C-V2X) communication device. Communication between the vehicles 2 (2a, 2b) assumed in the first embodiment can be implemented via the V2X type communication system 6 in each of the vehicles 2. The communication system 6 may transmit and receive a communication signal to and from a terminal present in the inside of the host vehicle 2. The terminal communication type communication system 6 is at least one of, for example, a Bluetooth (registered trademark) device, a Wi-Fi (registered trademark) device, and an infrared communication device.

The map DB 7 stores map data that can be used by the processing system 1. The map DB 7 includes at least one non-transitory tangible storage medium among, for example, a semiconductor memory, a magnetic medium, and an optical medium. The map DB 7 may be a DB of a locator that estimates a self-state amount of the vehicle 2 including a self-position. The map DB may be a DB of a navigation unit that navigates a travel path of the vehicle 2. The map DB 7 may be constructed by a combination of multiple DBs.

The map DB 7 acquires and stores latest map data by, for example, communicating with an external center via the V2X type communication system 6. The map data is two-dimensionally or three-dimensionally digitalized as data representing a traveling environment of the vehicle 2. As the three-dimensional map data, digital data of a high definition map may be used. The map data may include road data representing at least one of, for example, a position coordinate, a shape, and a road surface condition of a road structure. The map data may include marking data representing at least one of, for example, a traffic sign, a road display, and a position coordinate and a shape of a lane marking attached to a road. The marking data included in the map data may represent landmarks such as a traffic-control sign, an arrow marking, a lane marking, a stop line, a direction sign, a landmark beacon, a rectangular sign, a business sign, or a line pattern change of a road. The map data may include structure data representing at least one of, for example, position coordinates and shapes of a building and a traffic light facing a road. The marking data included in the map data may represent landmarks such as a street light, an edge of a road, a reflecting plate, a pole, or a back side of a traffic sign.

The information presentation system 4 presents notification information to occupants including the driver of the vehicle 2. The information presentation system 4 includes a visual presentation unit, an auditory presentation unit, and a skin sense presentation unit. The visual presentation unit presents the notification information by stimulating a visual sense of the occupant. The visual presentation unit is at least one of, for example, a head-up display (HUD), a multi function display (MFD), a combination meter, a navigation unit, and a light emitting unit. The auditory presentation unit presents the notification information by stimulating an auditory sense of the occupant. The auditory presentation unit is at least one of, for example, a speaker, a buzzer, and a vibration unit. The skin sense presentation unit presents the notification information by stimulating a skin sense of the occupant. The skin sense stimulated by the skin sense presentation unit includes at least one of, for example, a tactile sense, a temperature sense, and a wind sense. The skin sense presentation unit is at least one of, for example, a vibration unit of a steering wheel, a vibration unit of a driver's seat, a reaction force unit of the steering wheel, a reaction force unit of an accelerator pedal, a reaction force unit of a brake pedal, and an air conditioning unit.

As shown in FIG. 6, the processing system 1 is connected to the sensor system 5, the communication system 6, the map DB 7, and the information presentation system 4 via at least one of a LAN (Local Area Network), a wire harness, an internal bus, a wireless communication line, and the like. The processing system 1 includes at least one dedicated computer. The dedicated computer constituting the processing system 1 may be an integrated electronic control unit (ECU) that integrates driving control of the vehicle 2. The dedicated computer constituting the processing system 1 may be a determination ECU that determines the DDT in the driving control of the vehicle 2. The dedicated computer constituting the processing system 1 may be a monitoring ECU that monitors the driving control of the vehicle 2. The dedicated computer constituting the processing system 1 may be an evaluation ECU that evaluates the driving control of the vehicle 2.

The dedicated computer constituting the processing system 1 may be a navigation ECU that navigates the travel path of the vehicle 2. The dedicated computer constituting the processing system 1 may be a locator ECU that estimates the self-state amount including the self-position of the vehicle 2. The dedicated computer constituting the processing system 1 may be an actuator ECU that controls the motion actuator of the vehicle 2. The dedicated computer constituting the processing system 1 may be a human machine interface (HMI) control unit (HCU) that controls the information presentation in the vehicle 2. The dedicated computer constituting the processing system 1 may be at least one external computer that constructs an external center or a mobile terminal capable of communicating via, for example, the communication system 6.

The dedicated computer constituting the processing system 1 includes at least one memory 10 and at least one processor 12. The memory 10 is at least one non-transitory tangible storage medium among, for example, a semiconductor memory, a magnetic medium, and an optical medium that temporarily store a program, data, and the like that can be read by a computer. The processor 12 includes, as a core, at least one of, for example, a central processing unit (CPU), a graphics processing unit (GPU), and a reduced instruction set computer (RISC)-CPU.

The processor 12 executes multiple instructions included in a processing program stored in the memory 10 as software. Accordingly, the processing system 1 constructs multiple functional blocks for performing the driving-related processing of the vehicle 2. In this way, in the processing system 1, in order to perform the driving-related processing of the vehicle 2, the multiple functional blocks are constructed by the processing program stored in the memory 10 causing the processor 12 to execute the multiple instructions. The functional blocks realized by the processing system 1 include a sensing block 100, a planning block 120, a risk supervising block 140, and a control block 160 as shown in FIG. 8.

The sensing block 100 acquires sensor data from the external sensor 50 and the internal sensor 52 in the sensor system 5. The sensing block 100 acquires communication data from the communication system 6. The detection block 100 acquires the map data from the map DB 7. The detection block 100 detects internal and external environments of the vehicle 2 by fusion using these acquired data as inputs. By detecting the internal and external environments, the detection block 100 generates detection information to be given to the subsequent planning block 120 and risk monitoring block 140. In this way, it can be said that when the detection information is generated, the detection block 100 acquires the data from the sensor system 5 and the communication system 6, recognizes or interprets meaning of the acquired data, and integrates the acquired data to grasp situations including an external situation of the vehicle 2, a situation in which the vehicle 2 is placed, and an internal situation of the vehicle 2. The detection block 100 may give substantially the same detection information to the planning block 120 and the risk monitoring block 140. The sensing block 100 may provide different detection information to each of planning block 120 and risk supervising block 140.

The detection information generated by the detection block 100 describes a state detected for each scene in the traveling environment of the host vehicle 2. The detection block 100 may generate detection information on an object in the outside of the vehicle 2 by detecting the object. The object may be another road user 3, an obstacle, and a structure. The detection information on the object may represent at least one of, for example, a distance to the object, a relative speed of the object, a relative acceleration of the object, and an estimated state by tracking detection of the object. The detection information on the object may further represent a type recognized or specified based on a state of the detected object. The detection block 100 may generate detection information on a traveling road on which the vehicle 2 travels at present and in future by detecting the traveling road. The detection information of the travel route may represent, for example, at least one of states among a road surface, a lane, a roadside, a free space, and the like.

The detection block 100 may generate detection information on the self-state amount including the self-position of the vehicle 2 by localization of presumptively detecting the self-state amount. The detection block 100 may generate update information on map data related to the traveling road of the vehicle 2 at the same time as the detection information on the self-state amount, and feedback the update information to the map DB 7. The detection block 100 may generate detection information on a marking associated with the traveling road of the host vehicle 2 by detecting the marking. The detection information on the marking may represent at least one state of, for example, a sign, a lane marking, and a traffic light. The detection information on the marking may further represent a traffic rule recognized or specified based on a state of the marking. The detection block 100 may generate detection information on a weather situation for each scene in which the host vehicle 2 travels by detecting the weather situation. The detection block 100 may generate detection information on a time for each traveling scene of the vehicle 2 by detecting the time.

The planning block 120 acquires the detection information from the sensing block 100. The planning block 120 plans the driving control of the vehicle 2 according to the acquired detection information. In the planning of the driving control, a control command related to a navigation operation of the vehicle 2 and an assistance operation of the driver is generated. That is, the planning block 120 implements a DDT function that generates the control command as a motion control request for the vehicle 2. The control command generated by the planning block 120 may include a control parameter for controlling the motion actuator of the vehicle 2. Examples of the motion actuator to which the control command is output include at least one of, for example, an internal combustion engine, an electric motor, a power train in which the internal combustion engine and the electric motor are combined, a brake device, and a steering device.

The planning block 120 may generate a control command so as to comply with a driving policy by using the driving policy and a safety model described following safety of the driving policy. The driving policy followed by the safety model is defined based on, for example, a vehicle level safety strategy that guarantees safety of the intended functionality (hereinafter referred to as SOTIF). In other words, the safety model is described by following the driving policy on which the vehicle level safety strategy is implemented and modeling the SOTIF. The planning block 120 may train the safety model by a machine learning algorithm that back-propagates a driving control result to the safety model. As the safety model to be trained, at least one learning model among, for example, deep learning by a neural network such as a deep neural network (DNN) and reinforcement learning may be used. The safety model may be a safety-related model itself, or may be a model constituting a part of the safety-related model.

The planning block 120 may plan a path to be traveled in the future by the vehicle 2 by the driving control prior to generating the control command. The path planning may be executed by, for example, computation such as simulation in order to navigate the vehicle 2 based on the detection information. That is, the planning block 120 may implement a DDT function of planning the path as a tactical action of the vehicle 2. The planning block 120 may further plan, for the vehicle 2 following the planned path, an appropriate trajectory based on the acquired detection information prior to generating the control command. That is, the planning block 120 may implement a DDT function of planning the trajectory of the vehicle 2. The trajectory planned by the planning block 120 may define at least one of, for example, a traveling position, a speed, an acceleration, and a yaw rate in time series, as the kinematic properties related to the host vehicle 2. The time series trajectory planning constructs a scenario of the future traveling by the navigation on the host vehicle 2. The planning block 120 may generate the trajectory by planning using the safety model. In this case, the safety model may be trained by a machine learning algorithm based on a calculation result obtained by calculating a cost function for giving a cost to the generated trajectory.

The planning block 120 may plan adjustment of a level of driving automation in the vehicle 2 according to the acquired detection information. The adjustment of the level of driving automation may include takeover between the autonomous driving and manual driving. The takeover between the autonomous driving and the manual driving may be achieved in a scenario in association with entry or exit of an operational design domain in which the autonomous driving is executed by setting the operational design domain. In a scenario of exit from the operational design domain, that is, a scenario of takeover from the autonomous driving to the manual driving, an unreasonable situation in which it is determined that an unreasonable risk is present based on, for example, the safety model is exemplified as a use case. In the use case, the planning block 120 may plan a DDT fallback for causing a driver who will be a fallback ready user to give the vehicle 2 a minimal risk maneuverer and transition the vehicle 2 to a minimal risk condition.

The adjustment of the level of driving automation may include degradation traveling of the vehicle 2. In a scenario of degradation traveling, if an unreasonable risk is present due to takeover to manual driving, an unreasonable situation determined based on, for example, the safety model is exemplified as a use case. In the use case, the planning block 120 may plan a DDT fallback for transitioning the vehicle 2 to the minimal risk condition by autonomous traveling and autonomous stopping. The DDT fallback for transitioning the vehicle 2 to the minimal risk condition is not only achieved in adjustment of lowering the level of driving automation, but also achieved in adjustment of maintaining the level of driving automation and causing the host vehicle 2 to perform the degradation traveling, for example, in a minimum risk maneuver (MRM). In the DDT fallback for transitioning the vehicle 2 to the minimal risk condition, prominence of the transitioning situation may be enhanced by at least one of, for example, illumination, a horn sound, a signal, and a gesture.

The risk supervising block 140 acquires the detection information from the sensing block 100. The risk monitoring block 140 monitors a risk between the vehicle 2 and the other road user 3 for each scene based on the acquired detection information. The risk monitoring block 140 executes the risk monitoring of the other road user 3 in time series based on the detection information so as to guarantee the SOTIF of the vehicle 2. The other road user 3 assumed in the risk monitoring includes a non vulnerable road user such as an automobile, a truck, a motorcycle, and a bicycle, and a vulnerable road user such as a pedestrian. The other road user 3 assumed in the risk monitoring may further include an animal.

The risk monitoring block 140 sets, based on the acquired detection information for each scene, a safety envelope based on, for example, the vehicle level safety strategy, which guarantees the SOTIF in the vehicle 2. The risk monitoring block 140 may set a safety envelope between the vehicle 2 and the other road user 3 by using the safety model following the above driving policy. The safety model used to set the safety envelope may be designed to avoid, in accordance with accident liability rules, potential accident liability resulting from an unreasonable risk or road user misuse. In other words, the safety model may be designed such that the host vehicle 2 observes the accident responsibility rule following the driving policy. As such a safety model, for example, a responsibility sensitive safety model disclosed in Patent Literature 1 is exemplified.

In the setting of the safety envelope, based on the safety model assumed to follow the driving policy for the vehicle 2 and the other road user 3, a safety distance may be assumed based on a profile related to at least one kinematic property. The safety distance defines a boundary where a physics based margin is secured around the host vehicle 2 with respect to predicted motion of the other road user 3. The safety distance may be assumed in consideration of a response time until an appropriate response is executed by each of the vehicle 2 and the other road user 3. The safety distance may be assumed to observe the accident responsibility rule. In a scene in which a lane structure such as a lane is present, a safety distance for avoiding risks of a rear-end crash and a head-on crash in a longitudinal direction of the vehicle 2 and a safety distance for avoiding a risk of a side crash in a lateral direction of the vehicle 2 may be calculated. On the other hand, in a scene in which the lane structure is not present, a safety distance for avoiding a risk of a trajectory crash in any direction of the vehicle 2 may be calculated.

The risk monitoring block 140 may specify a situation for each scene of relative motion between the vehicle 2 and the other road user 3 prior to setting of the above safety envelope. In the scene in which the lane structure such as the lane is present, a situation in which the risks of the rear-end crash and the head-on crash in the longitudinal direction are assumed and a situation in which the risk of the side crash in the lateral direction is assumed may be specified. In the situation specifying in the longitudinal direction and the lateral direction, state amounts related to the vehicle 2 and the other road user 3 may be converted into a coordinate system assuming straight lanes. On the other hand, in the scene in which the lane structure is not present, a situation in which the risk of the trajectory crash in any direction of the vehicle 2 is assumed may be specified. For the above-described situation identification function, the situation identification result may be given to the risk supervising block 140 as the detection information by executing at least part of the situation identification function.

The risk monitoring block 140 executes safety determination between the host vehicle 2 and the other road user 3 based on the set safety envelope and the acquired detection information for each scene. That is, the risk monitoring block 140 executes safety determination by testing whether there is an envelope violation that is a violation of the safety envelope in a traveling scene interpreted based on the detection information between the vehicle 2 and the other road user 3. When the safety distance is assumed in the setting of the safety envelope, if an actual distance between the vehicle 2 and the other road user 3 exceeds the safety distance, it may be determined that there is no envelope violation. On the other hand, if the actual distance between the vehicle 2 and the other road user 3 is equal to or less than the safety distance, it may be determined that there is an envelope violation.

When it is determined that there is an envelope violation, the risk monitoring block 140 may calculate a reasonable scenario for giving an appropriate action to be taken as the appropriate response to the vehicle 2 by simulation. In the simulation of the reasonable scenario, state transition between the vehicle 2 and the other road user 3 is estimated, so that an action to be taken for each transition state may be set as a constraint on the vehicle 2. In the setting of the action, a limit value assumed for at least one kinematic property given to the vehicle 2 may be calculated so as to limit the motion kinematic property as a constraint on the vehicle 2.

The risk monitoring block 140 may directly calculate a limit value for observing the accident responsibility rule based on the profile related to at least one kinematic property, based on the safety model assumed to follow the driving policy for the vehicle 2 and the other road user 3. It may be said that the direct calculation of the restriction value is setting of the safety envelope and also said that it is setting of a constraint on the driving control. Therefore, when an actual value that is safer than the limit value is detected, it may be determined that there is no envelope violation. On the other hand, when an actual value beyond the limit value is detected, it may be determined that there is an envelope violation.

The risk supervising block 140 may store, in the memory 10, at least one type of evidence information such as detection information used to set the safety envelope, determination information indicative of the determination result of the safety envelope, detection information having an effect on the determination result, and simulated scenarios. The memory 10 in which the evidence information is stored may be mounted in the vehicle 2 according to the type of the dedicated computer constituting the processing system 1, or may be installed in an external center or the like outside the vehicle 2. The evidence information may be stored in an unencrypted state, or may be stored in an encrypted or hashed manner. The storage of the evidence information is executed at least when it is determined that there is an envelope violation. Of course, the storage of the evidence information may also be executed when it is determined that there is no envelope violation. The evidence information when it is determined that there is no envelope violation can be used as a lagging measure at a storage time point, and can also be used as a leading measure in the future.

The control block 160 acquires a control command from the planning block 120. The control block 160 acquires the determination information related to the safety envelope from the risk monitoring block 140. The control block 160 implements a DDT function of controlling the motion of the vehicle 2. When the control block 160 acquires the determination information indicating that there is no envelope violation, the control block 160 executes the planned driving control of the vehicle 2 according to the control command.

On the other hand, when the control block 160 acquires the determination information indicating that there is an envelope violation, the control block 160 gives a constraint following the driving policy based on the determination information on the planned driving control of the host vehicle 2. The constraint on the driving control may be a functional constraint. The restriction or the constraint on the driving control may be degraded constraints. The restriction or the constraint on the driving control may be a restriction different from the above-described restrictions or constraints. The restriction or constraint on the driving control is given by a restriction on the control command. When the reasonable scenario is simulated by the risk monitoring block 140, the control block 160 may limit the control command according to the scenario. At this time, when the limit value is set for the kinematic properties of the vehicle 2, the control parameter for the motion actuator included in the control command may be corrected based on the limit value.

Next, details of the first embodiment will be described below.

As illustrated in FIGS. 7, 8, and 10 to 13, the first embodiment assumes a lane structure Ls with separated lanes. The lane structure Ls restricts the motion of the vehicle 2 and the other road user 3 with a direction in which the lane extends as the longitudinal direction. The lane structure Ls restricts the motion of the vehicle 2 and the other road user 3 with a width direction or an alignment direction of the lanes as the lateral direction.

A driving policy in the lane structure Ls is defined, for example, in the following (A) to (E) or the like between the first vehicle 2a and the second vehicle 2b, one of which is assumed to be the vehicle 2 and the other is the other road user 3. A front of the vehicle 2 means, for example, a traveling direction of a turning circle at a current steering angle of the vehicle 2, a traveling direction of a straight line passing through a center of gravity of the vehicle orthogonal to an axle of the vehicle 2, or a traveling direction of the sensor system 5 of the vehicle 2 on an axis line of focus of expansion (FOE) of the same camera from a front camera module.

(A) Do not hit a vehicle traveling in front from behind (Do not hit someone from behind).

(B) Do not cut in recklessly between other vehicles (Do not cut-in recklessly).

(C) Yield to another vehicle even when own vehicle has a priority (Right-of-way is given, not taken).

(D) Be cautious in areas with limited visibility.

(E) If the host vehicle can avoid a crash without causing another one, take a reasonable action for that purpose (If you can avoid an accident without causing another one, you must do it).

In the safety model that is in compliance with the driving policy and models SOTIF, the action by the road user which does not lead to an unreasonable situation is assumed to be a reasonable action that is to be taken by the road user. An unreasonable situation between the vehicle 2 and the other road user 3 in the lane structure Ls is a head-on crash, a rear-end crash, or a side crash. A reasonable action for the head-on crash includes, for example, a braking by the reversely running vehicle 2a or 2b among the vehicles 2, between the first vehicle 2a and the second vehicle 2b, one of which is the other road user 3. A reasonable action for the rear-end crash includes, for example, avoidance a sudden braking of a certain degree or more by the vehicle 2a or 2b traveling in front among the first vehicle 2a and the second vehicle 2b and avoidance of a rear-end crash by the vehicle 2b or 2a traveling behind on the premise of the above. A reasonable action for the side crash includes, for example, a steering of the vehicles 2a and 2b traveling side by side in a direction separating from each other among the first vehicle 2a and the second vehicle 2b. When assuming the reasonable actions, the state amounts related to the vehicle 2 and the other road user 3 are converted into an orthogonal coordinate system that defines the longitudinal direction and the lateral direction assuming a linear and planar lane structure Ls regardless of whether the lane structure Ls has curved lanes or high and low lanes.

The safety model may be designed according to accident liability rules which assume that a moving body that does not take a reasonable action would be responsible for the accident. In the safety model used to monitor a risk between the vehicle 2 and the other road user 3 under the accident responsibility rule in the lane structure Ls, the safety envelope for the vehicle 2 is set so as to avoid potential accident responsibility by a reasonable action. Therefore, the risk monitoring block 140 in a normal situation of the entire processing system 1 in the vehicle 2 determines presence or absence of the envelope violation by checking the safety distance based on the safety model for each traveling scene with respect to the actual distance between the vehicle 2 and the other road user 3. When there is an envelope violation, the risk monitoring block 140 simulates a scenario for giving a reasonable action to the vehicle 2. Based on the simulation, the risk supervising block 140 sets, as a restriction on the driving control by the control block 160, a restriction value regarding at least one of speed and acceleration, for example.

Figure 14:
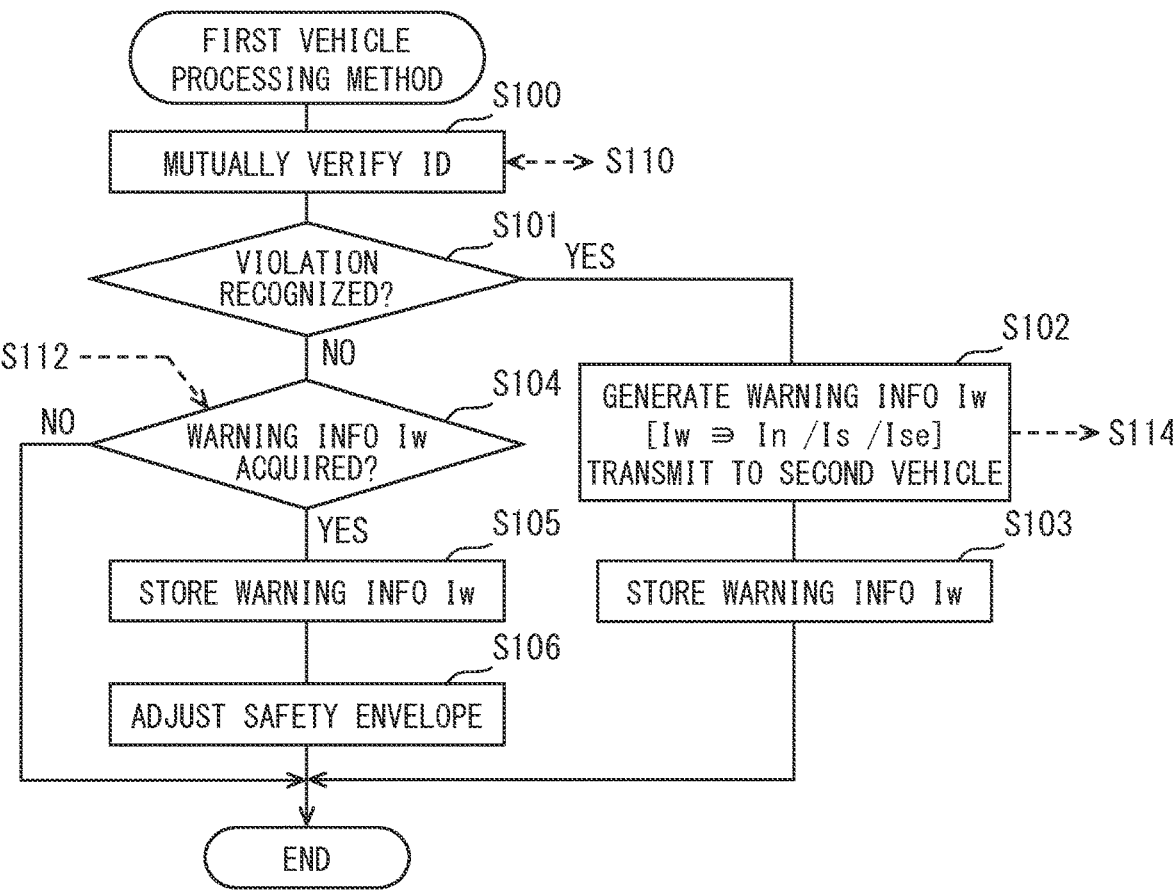
FIG. 14 is a flowchart showing a processing method according to the first embodiment.
Figure 15:
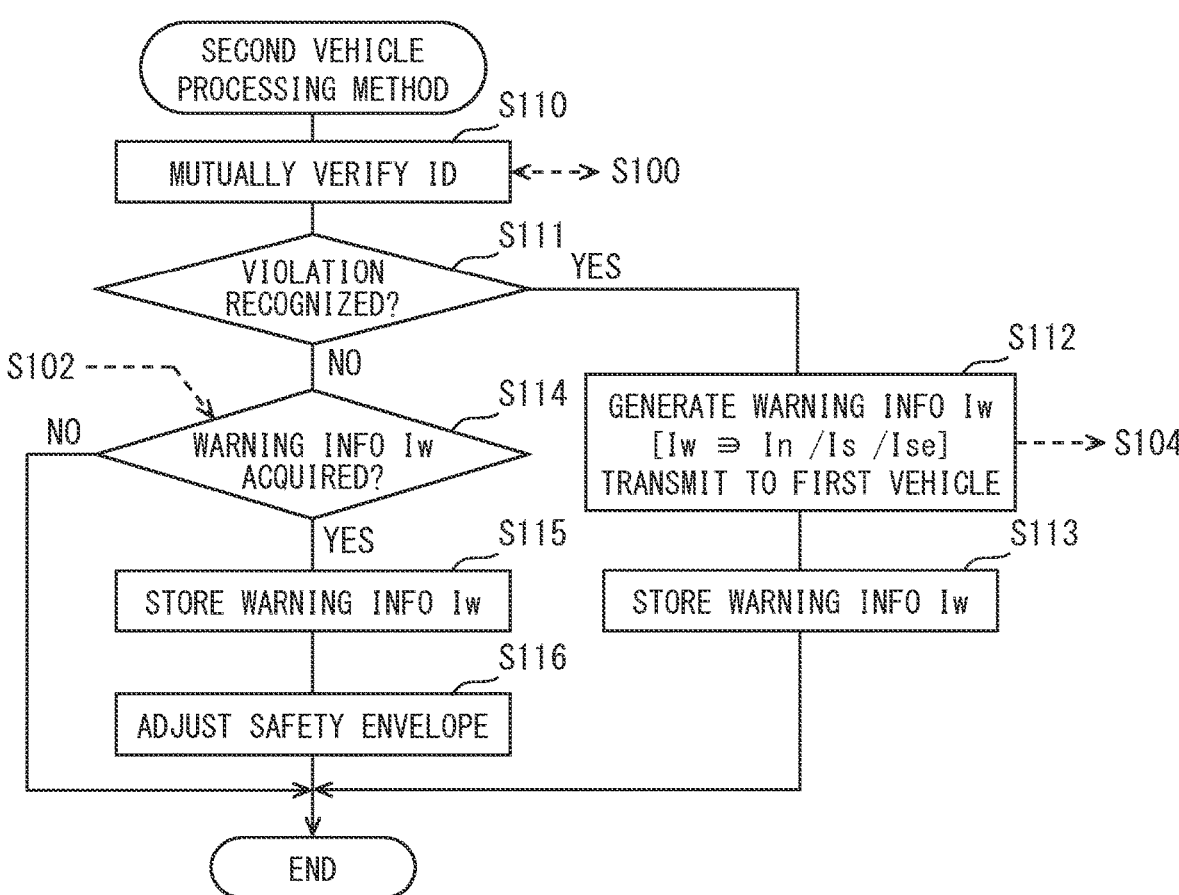
FIG. 15 is a flowchart showing a processing method according to the first embodiment.

In the first embodiment, in the first vehicle 2a and the second vehicle 2b assumed as the paired vehicles 2 that directly or indirectly communicate with each other, a processing method of performing the driving-related processing in cooperation with the respective functional blocks constructed by the processing system 1 is executed according to flowcharts illustrated in FIGS. 14 and 15. The processing method according to the first embodiment is repeatedly executed in each of the vehicles 2a and 2b when a mutual distance between the first vehicle 2a and the second vehicle 2b is within a monitoring scope of the safety envelope. Each "S" in the processing method in the following description means each of multiple steps executed by the multiple instructions included in the processing program in the processing system 1 of each of the vehicles 2a and 2b.

In S100 and S110 illustrated in FIGS. 14 and 15, each risk monitoring block 140 of the first vehicle 2a and the second vehicle 2b performs mutual authentication by exchanging a user ID including an authentication key through mutual communication. The mutual authentication may be mere confirmation of security and confirmation of whether communication is possible. The mutual authentication may be accompanied by confirmation of whether the used safety model or driving policy has a safety envelope setting function in addition to the confirmation of security and the confirmation of whether communication is possible.

As shown in FIG. 14, at S101 subsequent to S100 of the processing method, the risk monitoring block 140 of the first vehicle 2a monitors, based on the safety model of the first vehicle 2a, the envelope violation regarding the safety envelope where SOTIF between the first vehicle 2a and the second vehicle 2b is set according to the driving policy. As indicated by the solid circle in FIG. 12, if at least a portion of the second vehicle 2b is within the safe distance that defines the safety envelope based on the safety model of the first vehicle 2a, the envelope violation is recognized. Therefore, when the risk monitoring block 140 of the first vehicle 2a determines at S101 that an envelope violation occurs, the current flow for the first vehicle 2a sequentially proceeds to S102, S103 as illustrated in FIG. 14. That is, S102 and S103 are executed when an envelope violation between the first vehicle 2a and the second vehicle 2b is recognized.

In S102, the risk monitoring block 140 of the first vehicle 2a generates warning information Iw for warning the second vehicle 2b of the envelope violation. The warning information Iw may include notification information In for pushing notification from the first vehicle 2a to the second vehicle 2b about occurrence of an event such as the envelope violation. The warning information Iw may be combined information in which situation information Is is added to the notification information In. The situation information Is may include envelope information Ise related to the safety envelope set in the first vehicle 2a.

The envelope information Ise may represent a range of a safety envelope including the safety distance, which serves as a criterion for determining the envelope violation in the first vehicle 2a. The envelope information Ise may represent at least one risk type among, for example, a rear-end crash risk, a head-on crash risk, a side crash risk, an intersection risk, a blind spot risk, and detailed situations thereof, which are assumed as relative states between the first vehicle 2a and the second vehicle 2b, by a safety model that defines the safety envelope that serves as the criterion for determining the envelope violation.

The envelope information Ise may represent, as the detection information of the first vehicle 2a detected by the detection block 100 of the first vehicle 2a in the scene of the envelope violation, at least one of, for example, a self-state amount including a position (that is, a localization estimation value), a distance, a speed, an acceleration or deceleration, a relative speed, a relative acceleration, an estimated state including vectors of the above, and a type. In particular, the envelope information Ise may represent, as a kinematic property of the envelope violation, which is beyond the limit value obtained by the constraint setting of the risk monitoring block 140 in the first vehicle 2a, at least one type of detection information detected by the detection block 100 of the first vehicle 2a among the speed, the acceleration or deceleration, and the like of the first vehicle 2a.

The envelope information Ise may represent, as the detection information of the second vehicle 2b detected by the detection block 100 of the first vehicle 2a in the scene of the envelope violation, at least one of, for example, a position, a distance, a speed, an acceleration or deceleration, a relative speed, a relative acceleration, an estimated state including vectors of the above, and a type. In particular, the envelope information Ise may represent, as a kinematic property of the envelope violation, which is beyond the limit value obtained by the constraint setting of the risk monitoring block 140 in the first vehicle 2a, at least one type of detection information detected by the detection block 100 of the first vehicle 2a among the speed, the acceleration or deceleration, and the like of the second vehicle 2b. The envelope information Ise may include an image or a video including the second vehicle 2b, which is captured by a camera that is the external sensor 50 of the first vehicle 2a in the scene of the envelope violation.

In addition to the envelope information Ise, the situation information Is may represent, as a planning situation in the planning block 120 of the first vehicle 2a in the scene of the envelope violation, at least one of, for example, a path, a trajectory, a control parameter, an level of driving automation (including a case where the manual driving is set to a level 0). The situation information Is may represent, as a road situation in the scene of the envelope violation, at least one of, for example, a traffic rule, a marking, a road structure, a location, a section, a road surface condition, a light and shade condition, a construction condition, a traffic congestion situation, an existence situation of an obstacle including a falling object, a feature structure around a road, and a blind spot caused by the feature structure or a moving object type. The situation information Is may represent at least one of, for example, a time period of a violation scene including distinction between day and night and a climate condition (that is, weather) of the violation scene, in the scene of the envelope violation.

The warning information Iw generated at S102 can be transmitted from the first vehicle 2a to the second vehicle 2b according to the control of the communication system 6 by the risk monitoring block 140 of the first vehicle 2a. In other words, the risk monitoring block 140 of the first vehicle 2a generates the warning information Iw of the envelope violation such that the warning information Iw is transmitted in real time from the first vehicle 2a to the second vehicle 2b in response to the determination that there is an envelope violation. In the present embodiment, the transmission between the vehicles 2a and 2b may be achieved directly by the communication systems 6 such as the V2V type communication systems 6, may be achieved indirectly via a remote center such as a cloud server, or may be achieved via a mesh network configured between multiple vehicles including the vehicles 2a and 2b.

At S103, the risk monitoring block 140 of the first vehicle 2a stores the generated warning information Iw in the memory 10 of the first vehicle 2a. The warning information Iw may be stored in association with a time stamp indicating a generation time or a transmission time of the first vehicle 2a, so that the warning information Iw at multiple time points may be accumulated. The warning information Iw may be stored through encryption processing or hashing processing in the first vehicle 2a. The warning information Iw may be stored as evidence information. The warning information Iw may be deleted after a set period elapses since the generation time or the transmission time of the first vehicle 2a. When the execution of S103 is completed, the current flow for the first vehicle 2a is ended.

As shown in FIG. 15, at S111 subsequent to S110, the risk monitoring block 140 of the second vehicle 2b monitors, based on the safety model of the second vehicle 2b, the envelope violation regarding the safety envelope where SOTIF between the first vehicle 2a and the second vehicle 2b is set in the second vehicle 2b according to the driving policy. As indicated by the solid circle in FIGS. 10 to 12, if the entire first vehicle 2a is outside of the safety distance that defines the safety envelope based on the safety model of the second vehicle 2b, the envelope violation is not recognized at the second vehicle 2b. Therefore, when the risk monitoring block 140 of the second vehicle 2b determines in S111 that no envelope violation occurs, the current flow for the second vehicle 2b proceeds to S114 as illustrated in FIG. 15.

At S114, the risk monitoring block 140 of the second vehicle 2b determines whether the warning information Iw from the first vehicle 2a is acquired by receiving through the communication system 6 of the second vehicle 2b. At S114, when the risk monitoring block 140 of the second vehicle 2b determines that the warning information Iw is not acquired, the current flow for the second vehicle 2b is ended.

Figure 12:
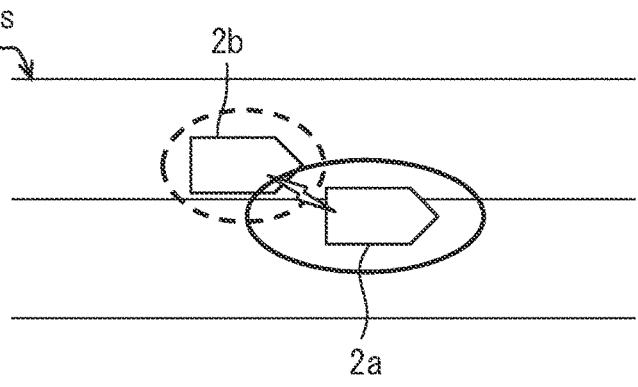
FIG. 12 is a schematic diagram illustrating a lane structure example and a processing method according to the first embodiment.

On the other hand, at S114, when the risk monitoring block 140 of the second vehicle 2b determines that the warning information Iw is acquired, the current flow for the second vehicle 2b is sequentially transitioned to S115 and S116. That is, S115 and S116 are executed in response to the acquisition of the warning information Iw in real time when the envelope violation with respect to the first vehicle 2a is not recognized at the second vehicle 2b even though the envelope violation with respect to the second vehicle 2b is recognized at the first vehicle 2a. Here, FIG. 12 shows an example where a difference generates in the recognition results between the vehicles 2a, 2b since the safety distance that defines the safety envelope for the second vehicle 2b based on the safety model is shorter than the safety distance that defines the safety envelope for the first vehicle 2a based on the safety model.

As illustrated in FIG. 15, in S115, the risk monitoring block 140 of the second vehicle 2b stores the acquired warning information Iw in the memory 10 of the second vehicle 2b. The warning information Iw may be stored in association with the time stamp indicating the generation time or the transmission time of the first vehicle 2a or an acquisition time (that is, a receiving time) of the second vehicle 2b, so that the warning information Iw at multiple time points may be accumulated. The warning information Iw may be stored through encryption processing or hashing processing in the second vehicle 2b. The warning information Iw may be stored as evidence information. The warning information Iw may be deleted after a setting period elapses since the generation time or the transmission time of the first vehicle 2a or the acquisition time of the second vehicle 2b.

The risk monitoring block 140 of the second vehicle 2b in S116 adjusts the safety envelope where the SOTIF is set according to the driving policy between the second vehicle 2b and the first vehicle 2a. Adjusting the safety envelope may be performed by correcting setting parameters or learning parameters in the safety model. In this case, the correction amount for updating the parameters may be determined by verification and validation of the safety model of the second vehicle 2b based on at least the envelope information Ise of the warning information Iw from the first vehicle 2a. When the execution in S116 is ended, the current flow for the second vehicle 2b is ended.

A case where the first vehicle 2a is a transmission side of the warning information Iw and the second vehicle 2b is a receiving side of the warning information Iw has been described. Next, a case where the second vehicle 2b is the transmission side of the warning information Iw and the first vehicle 2a is the receiving side of the warning information Iw will be described.

Figure 13:
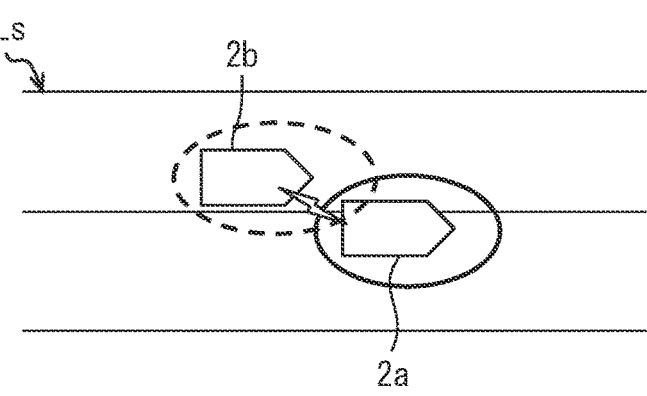
FIG. 13 is a schematic diagram illustrating a lane structure example and a processing method according to the first embodiment.

As indicated by the broken-line circle in FIG. 13, if at least a portion of the first vehicle 2a is within the safe distance that defines the safety envelope based on the safety model of the second vehicle 2b, the envelope violation is recognized. Therefore, when the risk monitoring block 140 of the second vehicle 2b determines in S111 that an envelope violation occurs, the current flow for the second vehicle 2b sequentially proceeds to S112, S113 as illustrated in FIG. 15. That is, S112 and S113 are executed when an envelope violation between the first vehicle 2a and the second vehicle 2b is recognized at the second vehicle 2b.

In S112, the risk monitoring block 140 of the second vehicle 2b executes processing of reversely replacing the first vehicle 2a and the second vehicle 2b in the description of S102 as the processing of generating the warning information Iw. At S113, the risk monitoring block 140 of the second vehicle 2b executes processing of reversely replacing the first vehicle 2a and the second vehicle 2b in the description of S103 as processing of storing the warning information Iw. When the execution at S113 is ended, the current flow for the second vehicle 2b is ended.

Before the execution of S113 or before the end of the current flow after the execution of S114, the risk monitoring block 140 of the second vehicle 2b may perform the common recognition with the first vehicle 2a as to the scene where the envelope violation occurs by executing the acquisition determination processing of the warning information Iw according to S114. Similarly, before the execution of S113 or before the end of the current flow after the execution of S103, the risk monitoring block 140 of the first vehicle 2a may perform the common recognition with the second vehicle 2b as to the scene where the envelope violation occurs by executing the acquisition determination processing of the warning information Iw according to S114.

Figure 10:
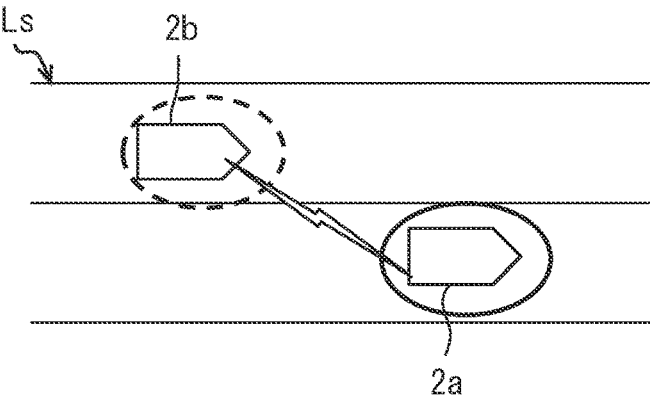
FIG. 10 is a schematic diagram illustrating a lane structure example and a processing method according to the first embodiment.
Figure 11:
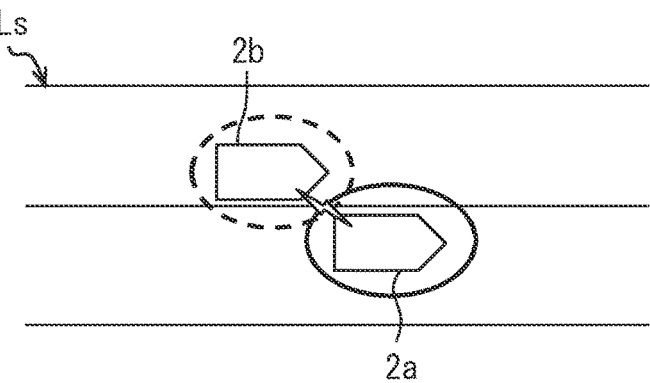
FIG. 11 is a schematic diagram illustrating a lane structure example and a processing method according to the first embodiment.

As indicated by the solid circle in FIGS. 10, 11 and 13, if the entire first vehicle 2a is outside of the safety distance that defines the safety envelope based on the safety model of the first vehicle 2a, the envelope violation is not recognized at the first vehicle 2a. Therefore, when the risk monitoring block 140 of the first vehicle 2a determines at S101 that an envelope violation does not occur, the current flow for the first vehicle 2a proceeds to S104 as illustrated in FIG. 14. At S104, the risk monitoring block 140 of the first vehicle 2a executes processing of reversely replacing the first vehicle 2a and the second vehicle 2b in the description of S114 as the acquisition determination processing of the warning information Iw. Therefore, when the risk monitoring block 140 of the first vehicle 2a determines in S104 that the warning information Iw is not acquired, the current flow for the first vehicle 2a is ended.

On the other hand, when the risk monitoring block 140 of the first vehicle 2a determines in S104 that the warning information Iw is acquired, the current flow for the first vehicle 2a is sequentially transitioned to S105 and S106. That is, as shown in FIGS. 13, S105 and S106 are executed in response to the acquisition of the warning information Iw in real time when the envelope violation with respect to the second vehicle 2b is not recognized at the first vehicle 2a even though the envelope violation with respect to the first vehicle 2a is recognized at the second vehicle 2b. Here, FIG. 13 shows an example where a difference generates in the recognition results between the vehicles 2a, 2b since the safety distance that defines the safety envelope for the first vehicle 2a based on the safety model is shorter than the safety distance that defines the safety envelope for the second vehicle 2b based on the safety model.

As illustrated in FIG. 14, in S105, the risk monitoring block 140 of the first vehicle 2a executes processing of reversely replacing the first vehicle 2a and the second vehicle 2b in the description of S115 as processing of storing the warning information Iw. In S106, the risk monitoring block 140 of the first vehicle 2a executes processing of reversely replacing the first vehicle 2a and the second vehicle 2b in the description of S116 as processing of adjusting the safety envelope. When the execution of S106 is completed, the current flow for the first vehicle 2a is ended.

As described above, according to the viewpoint of the first vehicle 2a in the first embodiment, in the first vehicle 2a serving as the host moving object, the envelope that is a violation of a safety envelope in which the SOTIF is set with respect to the second vehicle 2b as the target moving object is monitored. Therefore, when the envelope violation is recognized, the first vehicle 2a generates the warning information Iw for warning against the envelope violation such that the warning information Iw is transmitted to the second vehicle 2b. Accordingly, since the envelope violation warned by the first vehicle 2a can be commonly recognized in the second vehicle 2b, it is possible to promote improvement of a response capability with respect to the behavior of the other vehicle.

On the other hand, according to the viewpoint of the second vehicle 2b in the first embodiment, in the second vehicle 2b serving as the host moving object, the warning information Iw for warning against the envelope violation that is the violation of the safety envelope in which the SOTIF is set with respect to the second vehicle 2b in the first vehicle 2a serving as the target moving object is acquired from the first vehicle 2a. Therefore, in response to the acquisition of the warning information Iw, in the second vehicle 2b, the safety envelope with respect to the first vehicle 2a is adjusted. Accordingly, since the envelope violation warned by the first vehicle 2a is commonly recognized by the second vehicle 2b and the recognized envelope violation can be considered when adjusting the safety envelope, it is possible to promote improvement of a response capability with respect to the behavior of the other vehicle.

According to the viewpoint of the second vehicle 2b in the first embodiment, in the second vehicle 2b serving as the host moving object, an envelope that is a violation of the safety envelope in which the SOTIF is set with respect to the first vehicle 2a serving as the target moving object is monitored. Therefore, when the envelope violation is recognized, the second vehicle 2b generates the warning information Iw for warning against the envelope violation such that the warning information Iw is transmitted to the first vehicle 2a. Accordingly, since the envelope violation warned by the second vehicle 2b can be commonly recognized in the second vehicle 2a, it is possible to promote improvement of a response capability with respect to the behavior of the other vehicle.

On the other hand, according to the viewpoint of the first vehicle 2a in the first embodiment, in the first vehicle 2a serving as the host moving object, the warning information Iw for warning against the envelope violation that is the violation of the safety envelope in which the SOTIF is set with respect to the first vehicle 2a in the second vehicle 2b serving as the target moving object is acquired from the second vehicle 2b. Therefore, in response to the acquisition of the warning information Iw, in the first vehicle 2a, the safety envelope with respect to the second vehicle 2b is adjusted. Accordingly, since the envelope violation warned by the second vehicle 2b is commonly recognized by the first vehicle 2a and the recognized envelope violation can be considered when adjusting the safety envelope, it is possible to promote improvement of a response capability with respect to the behavior of the other vehicle.

Second Embodiment

A second embodiment is a modification to the first embodiment.

Figure 17:
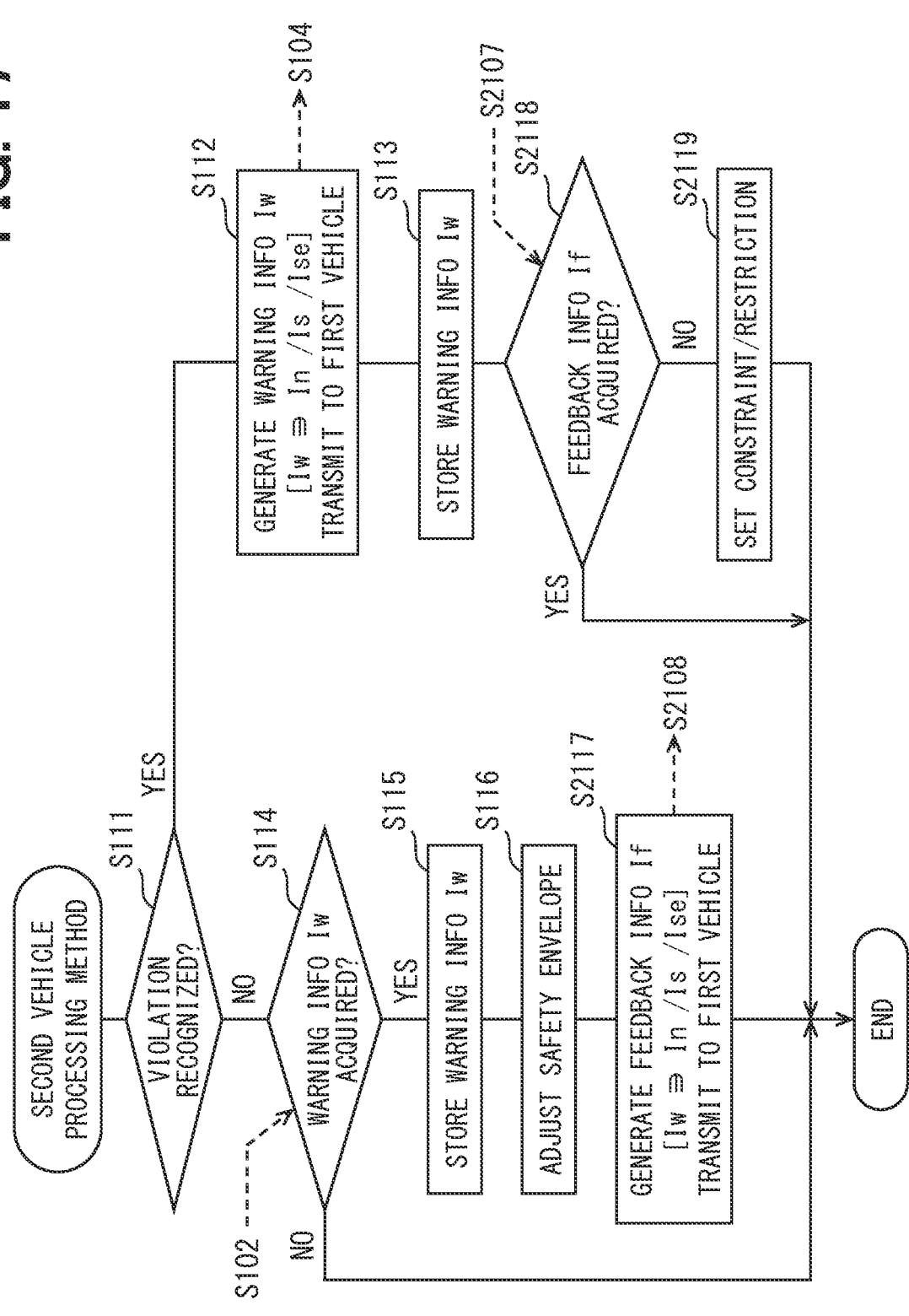
FIG. 17 is a flowchart showing a processing method according to the second embodiment.

In a processing method according to the second embodiment in which the first vehicle 2a and the second vehicle 2b are illustrated in FIGS. 16 and 17 respectively, the execution in S100 and S110 is omitted. Accordingly, in the processing method, S2107 to S2109 at the first vehicle 2a and S2117 to S2119 at the second vehicle 2b are added.

As illustrated in FIG. 17, at S2117 following S116, the risk monitoring block 140 of the second vehicle 2b generates feedback information If for feeding back acquisition of the warning information Iw to the first vehicle 2a. The feedback information If may include notification information In for pushing notification from the second vehicle 2b to the first vehicle 2a about the acquisition of the warning information Iw. The feedback information If may be combined information in which the situation information Is obtained by reversely replacing the first vehicle 2a and the second vehicle 2b in the description of S102 is added to the notification information In. That is, the situation information Is may include the envelope information Ise related to a safety envelope set in the second vehicle 2b.

The warning information Iw generated in S2117 can be transmitted from the second vehicle 2b to the first vehicle 2a according to control of the communication system 6 by the risk monitoring block 140 of the second vehicle 2b. In other words, the risk monitoring block 140 of the second vehicle 2b generates the feedback information If for the warning information Iw such that the feedback information If is transmitted in real time from the second vehicle 2b to the first vehicle 2a in response to the acquisition of the warning information Iw. When the execution at S2117 is ended, the current flow for the second vehicle 2b is ended.

As illustrated in FIG. 16, in S2108 following S103, the risk monitoring block 140 of the first vehicle 2a determines whether the feedback information If from the second vehicle 2b is acquired by receiving via the communication system 6 of the first vehicle 2a within a set time from the transmission of the warning information Iw. When the risk monitoring block 140 of the first vehicle 2a determines in S2108 that the feedback information If is acquired, the current flow for the first vehicle 2a is ended.

Through such step S2108, the risk monitoring block 140 of the first vehicle 2a can check that common recognition with the second vehicle 2b as to the scene where the envelope violation occurs is executed. In S2108, the risk monitoring block 140 of the first vehicle 2a may, in response to the acquisition of the feedback information If, delete the warning information Iw corresponding to the acquisition from the memory 10 of the first vehicle 2a. Alternatively, in S2108, the risk monitoring block 140 of the first vehicle 2a may store, in the memory 10 of the first vehicle 2a, the feedback information If acquired corresponding to the warning information Iw in S103.

On the other hand, when the risk monitoring block 140 of the first vehicle 2a determines in S2108 that the feedback information If is not acquired, the current flow for the first vehicle 2a is transitioned to S2109. In S2109, the risk monitoring block 140 of the first vehicle 2a sets a constraint for avoiding an unreasonable risk for motion control of the first vehicle 2a. The constraint for avoiding the risk is a degradation command to the control block 160 for the first vehicle 2a to execute a degraded traveling such as emergency evacuation action or MRM with best effort for the first vehicle 2a. The constraint for avoiding the risk may be a limit command to the control block 160 of the first vehicle 2a, which gives a constraint for transitioning the first vehicle 2a to a minimal risk condition. The constraint for avoiding the risk may be a minor constraint of at least one of limiting a speed of the first vehicle 2a, limiting an acceleration of the first vehicle 2a, and keeping the first vehicle 2a away from the second vehicle 2b. In such constraint setting processing, when the first vehicle 2a cannot acquire the feedback information If for the transmission of the warning information Iw from itself due to factors such as the processing system 1 not being applied to the second vehicle 2b or the communication system 6 not being mounted on the second vehicle 2b, a more safer risk avoidance action is possible. When the execution in S2109 is ended, the current flow for the first vehicle 2a is ended. In the first vehicle 2a in which the current flow is ended without acquiring the feedback information If, the generation and transmission of the warning information Iw are repeated in S102 of a next flow when the envelope violation continues even in S101 in the next flow.

A case where the second vehicle 2b is a transmission side of the feedback information If and the first vehicle 2a is a receiving side of the feedback information If has been described. Next, a case where the first vehicle 2a is the transmission side of the feedback information If and the second vehicle 2b is the receiving side of the feedback information If will be described.

In S2107 following S106, the risk monitoring block 140 of the first vehicle 2a executes processing of reversely replacing the first vehicle 2a and the second vehicle 2b in the description of S2117 as generation processing of the feedback information. When the execution in S2107 is ended, the current flow for the first vehicle 2a is ended.

As illustrated in FIG. 17, in S2118 following S113, the risk monitoring block 140 of the second vehicle 2b executes processing of reversely replacing the first vehicle 2a and the second vehicle 2b in the description of S2108 as acquisition determination processing of the feedback information If. When the risk monitoring block 140 of the second vehicle 2b determines in S2118 that the feedback information If is acquired, the current flow for the second vehicle 2b is ended.

Through such step S2118, the risk monitoring block 140 of the second vehicle 2b can check that common recognition with the first vehicle 2a as to the scene where the envelope violation occurs is executed. In S2118, the risk monitoring block 140 of the second vehicle 2b may, in response to the acquisition of the feedback information If, delete the warning information Iw corresponding to the acquisition from the memory 10 of the second vehicle 2b. Alternatively, in S2118, the risk monitoring block 140 of the second vehicle 2b may store, in the memory 10 of the second vehicle 2b, the feedback information If acquired in correspondence with the warning information Iw in S103.

On the other hand, when the risk monitoring block 140 of the second vehicle 2b determines in S2118 that the feedback information If is not acquired, the current flow for the second vehicle 2b is transitioned to S2119. At S2119, the risk monitoring block 140 of the second vehicle 2b executes processing of reversely replacing the first vehicle 2a and the second vehicle 2b in the description of S103 as constraint setting processing for risk avoidance. In such constraint setting processing, when the second vehicle 2b cannot acquire the feedback information If for the transmission of the warning information Iw from itself due to factors such as the processing system 1 not being applied to the first vehicle 2a or the communication system 6 not being mounted on the first vehicle 2a, a more safer risk avoidance action is possible. When the execution in S2119 is ended, the current flow for the second vehicle 2b is ended. In the second vehicle 2b in which the current flow is ended without acquiring the feedback information If, the generation and transmission of the warning information Iw are repeated in S112 of a next flow when the envelope violation continues even in S111 in the next flow.

In such a second embodiment, the added processing method obtained by adding S2107 to 2109 and S2117 to S2119 to the first embodiment is executed mainly by the risk monitoring block 140 of the first vehicle 2a or the second vehicle 2b. Therefore, it is possible to promote improvement of a response capability with respect to the behavior of the other vehicle.

Third Embodiment

A third embodiment is a modification to the first embodiment.

Figure 18:
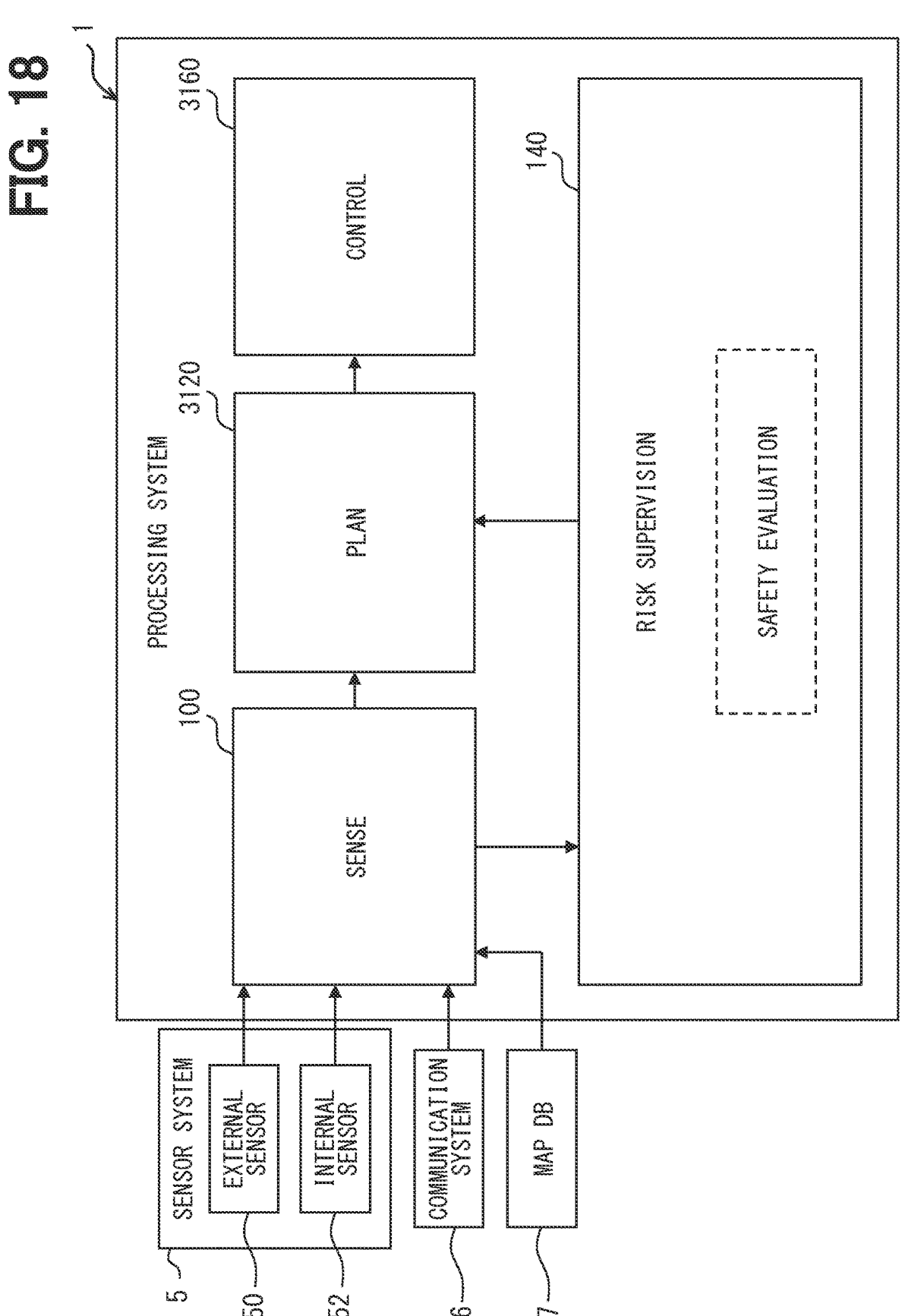
FIG. 18 is a block diagram showing a processing system according to a third embodiment.

As illustrated in FIG. 18, in a control block 3160 in the third embodiment, the processing of acquiring the determination information related to the safety envelope from the risk monitoring block 140 is omitted. The planning block 3120 according to the third embodiment acquires determination information on the safety envelope from the risk supervising block 140. The planning block 3120 plans driving control of the vehicle 2 according to the planning block 120 when the determination information indicating that there is no envelope violation is acquired. On the other hand, when the determination information indicating that there is an envelope violation is acquired, the planning block 3120 gives a constraint based on the determination information for the driving control at the stage of planning the driving control according to the planning block 120. That is, the planning block 3120 limits the driving control to be planned. In either case, the control block 3160 executes the driving control of the vehicle 2 planned by the planning block 3120.

In such a third embodiment, the processing method according to the first embodiment is executed mainly by the risk monitoring blocks 140 of the first vehicle 2a and the second vehicle 2b. Therefore, it is possible to promote improvement of a response capability with respect to the behavior of the other vehicle. The third embodiment may be combined with the second embodiment.

Fourth Embodiment

A fourth embodiment is a modification of the third embodiment.

Figure 19:
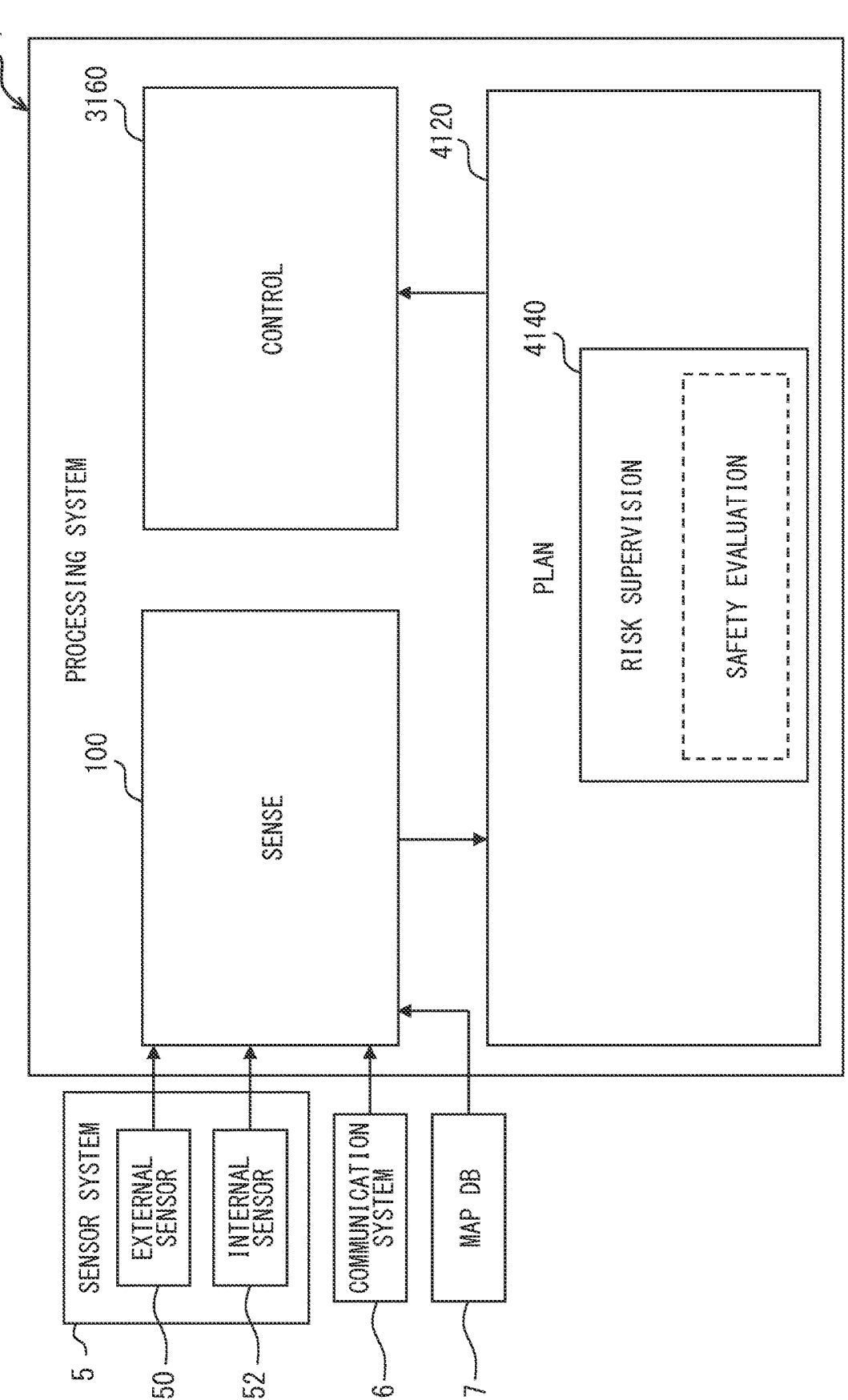
FIG. 19 is a block diagram showing a processing system according to a fourth embodiment.

As illustrated in FIG. 19, in a planning block 4120 in the fourth embodiment, a function of the risk monitoring block 140 is taken in as a risk monitoring sub-block 4140. When determination information indicating that there is no envelope violation is acquired by the risk monitoring sub-block 4140, the planning block 4120 plans driving control of the vehicle 2 according to the planning block 120. On the other hand, when determination information indicating that there is an envelope violation is acquired by the risk monitoring sub-block 4140, the planning block 4120 gives a constraint based on the determination information for the driving control at the stage of planning the driving control according to the planning block 120. That is, the planning block 4120 limits the driving control to be planned. In either case, the control block 3160 executes the driving control of the vehicle 2 planned by the planning block 4120.

In such a fourth embodiment, the processing method according to the first embodiment is executed mainly by the risk monitoring sub-blocks 4140 of the first vehicle 2a and the second vehicle 2b. Therefore, it is possible to promote improvement of a response capability with respect to the behavior of the other vehicle. The fourth embodiment may be combined with the second embodiment.

Fifth Embodiment

A fifth embodiment is a modification to the first embodiment.

Figure 20:
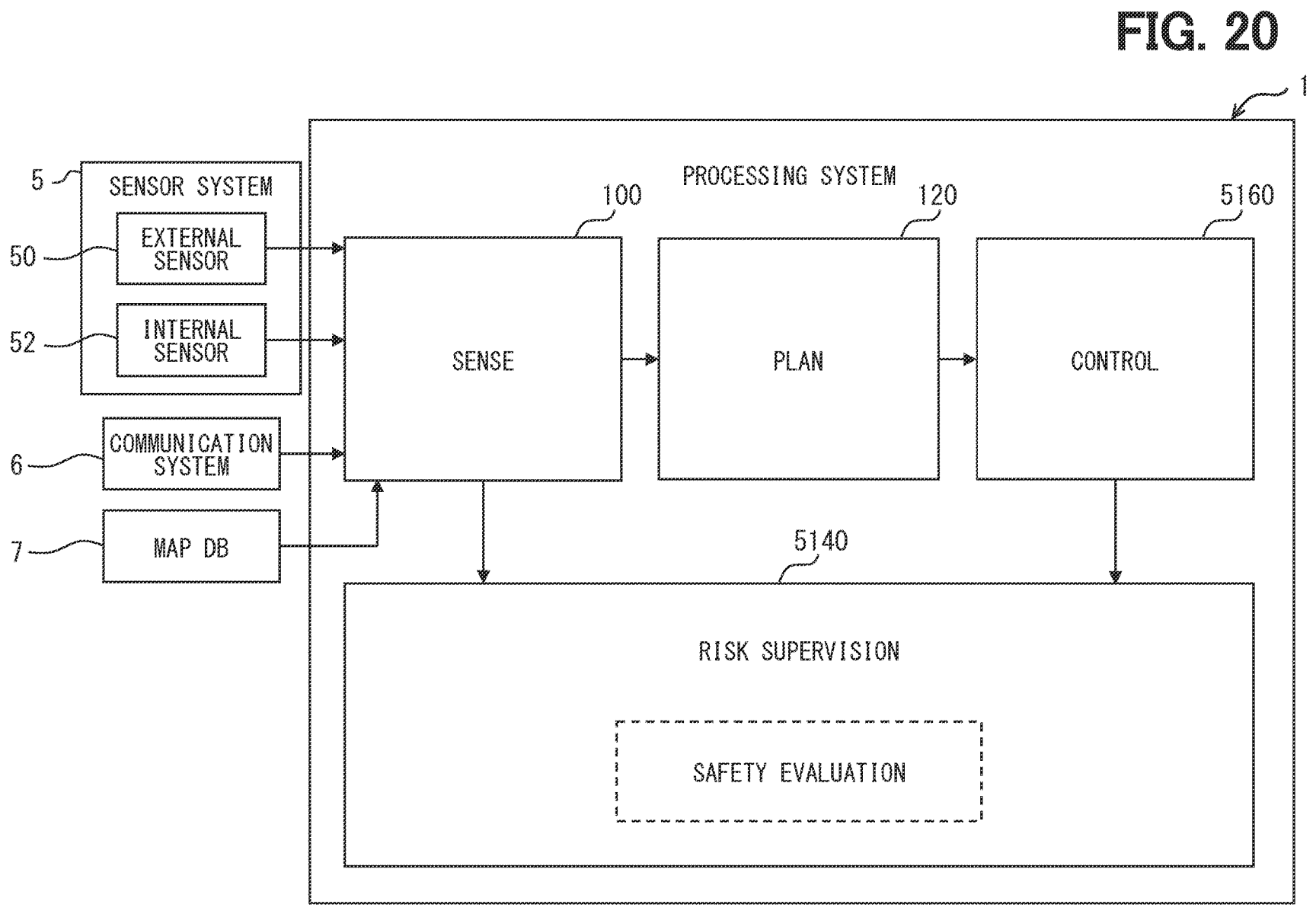

As illustrated in FIG. 20, in a control block 5160 in the fifth embodiment, the processing of acquiring the determination information related to the safety envelope from a risk monitoring block 5140 is omitted. Therefore, the risk monitoring block 5140 in the fourth embodiment acquires information indicating a result of driving control executed by the control block 5160 for the vehicle 2. The risk monitoring block 5140 evaluates the driving control by executing determination of an envelope violation on the result of the driving control.

In such a fifth embodiment, the processing method according to the first embodiment is executed mainly by the risk monitoring blocks 5140 of the first vehicle 2a and the second vehicle 2b. At this time, the adjustment processing of the safety envelope in S106 and S116 can improve the evaluation accuracy of the operation control. Therefore, it is possible to promote improvement of a response capability with respect to the behavior of the other vehicle. The fifth embodiment may be combined with the second embodiment. When the fifth embodiment is combined with the second embodiment, in S2109 and S2119, evaluation of the driving control based on a set constraint is executed.

Sixth Embodiment

A sixth embodiment is a modification of the first embodiment.

Figure 21:
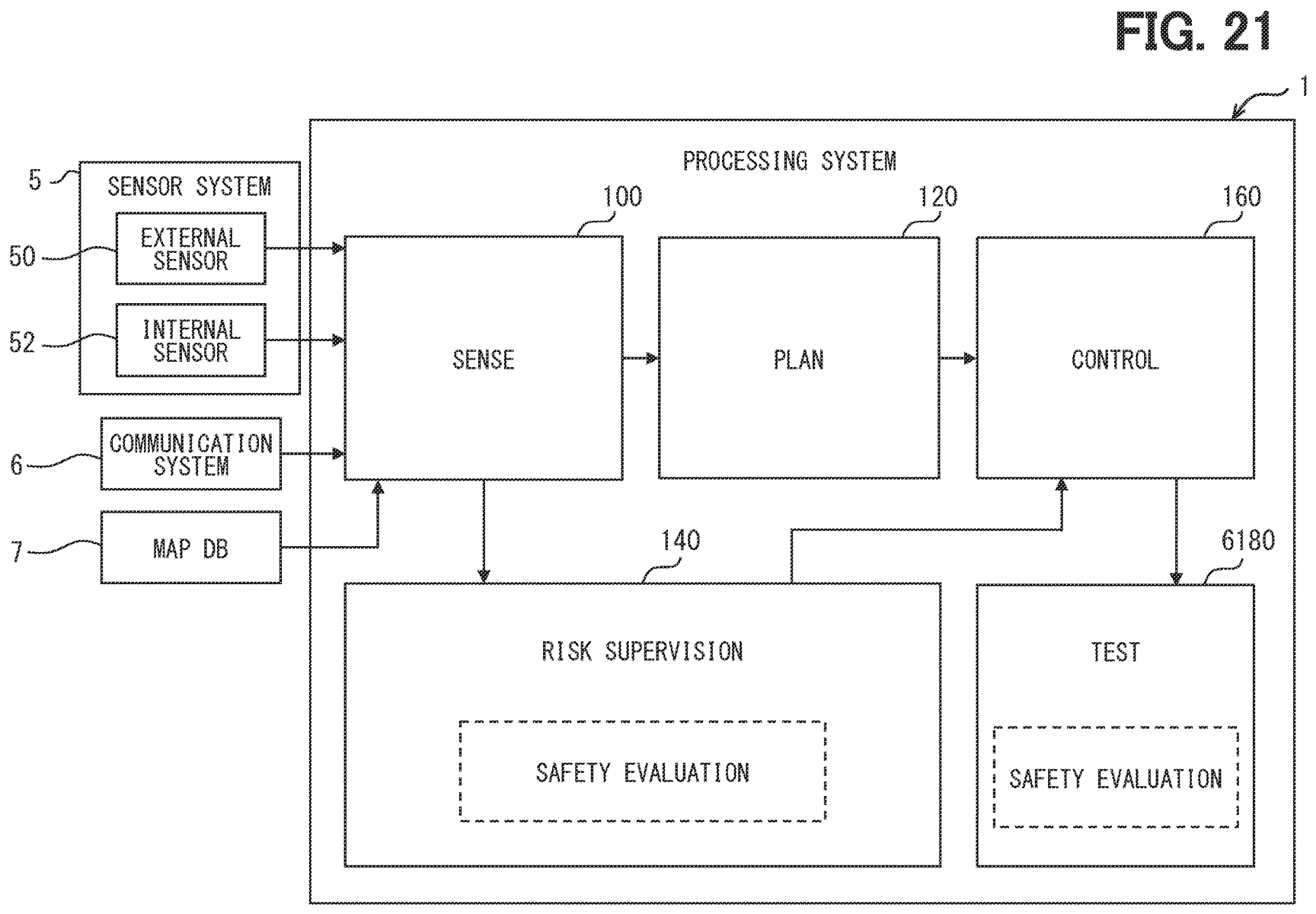
Figure 22:
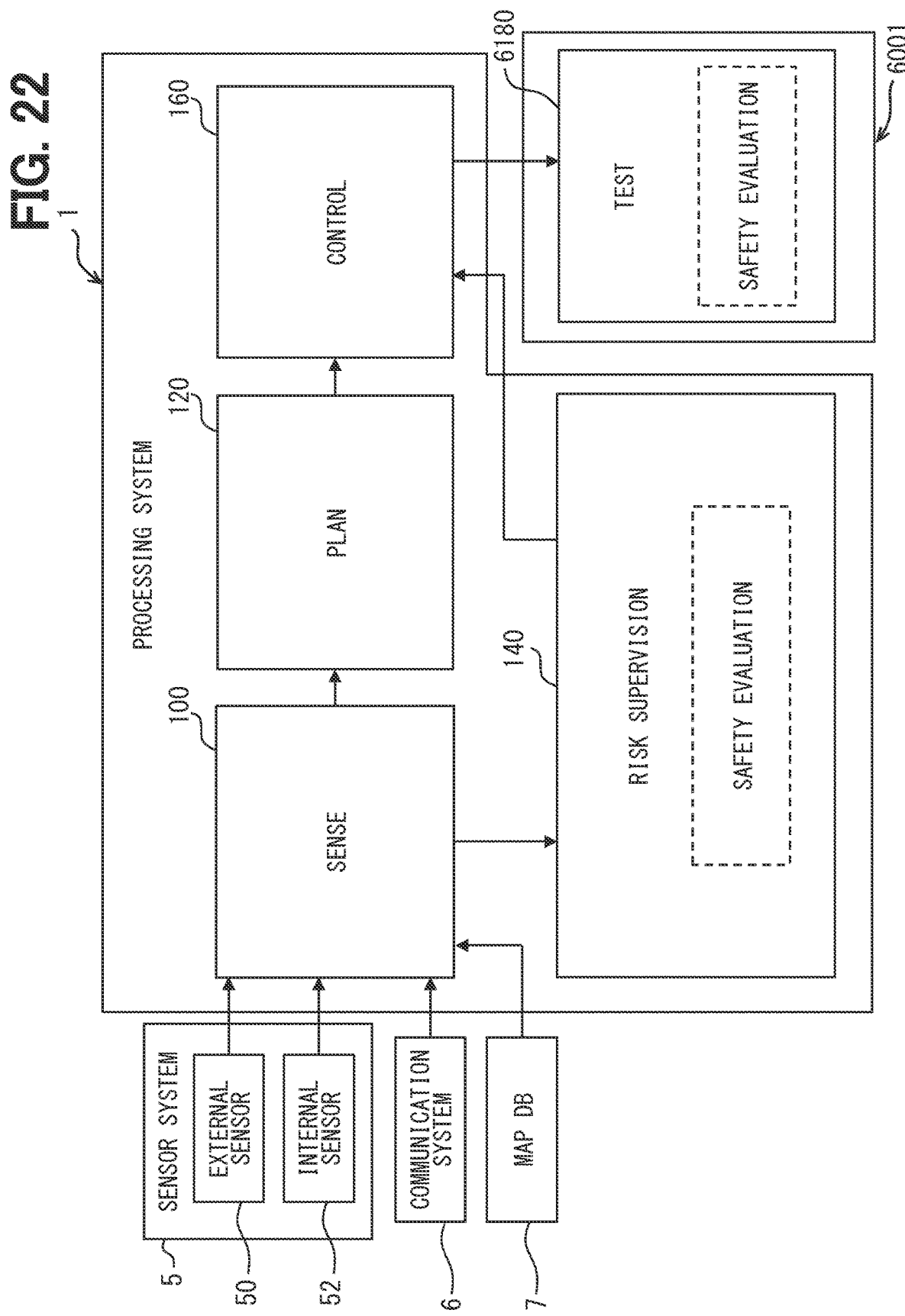
FIG. 22 is a block diagram showing a processing system according to the sixth embodiment.

As illustrated in FIGS. 21 and 22, in the sixth embodiment, a test block 6180 for testing the driving control by the control block 160 for, for example, safety permission or the like is added. Functions equivalent to the detection block 100 and the risk monitoring block 140 are given to the test block 6180. The test block 6180 may be realized by the processing system 1 shown in FIG. 21 executing a test program that is added to the processing program that provides the blocks 100, 120, 140, 160. The test block 6180 may be realized by a test processing system 6001 that is different from the processing system 1 and is shown in FIG. 22 executing a program for testing that is different from the processing program that provides the blocks 100, 120, 140, 160. The test processing system 6001 may include at least one dedicated computer including the memory 10 and the processor 12, which are connected to the processing system 1 (not illustrated in a case of connection via the communication system 6) in order to test the driving control.

In such a sixth embodiment, the processing method according to the first embodiment is executed mainly by the test blocks 6180 of the first vehicle 2a and the second vehicle 2b. At this time, the adjustment processing of the safety envelope in S106 and S116 can improve the evaluation accuracy of the operation control in a test. Therefore, it is possible to promote improvement of a response capability with respect to the behavior of the other vehicle. The sixth embodiment may be combined with the second embodiment. When the sixth embodiment is combined with the second embodiment, in S2109 and S2119, evaluation of the driving control as a test is executed based on a set constraint.

OTHER EMBODIMENTS

Although a plurality of embodiments have been described above, the present disclosure is not to be construed as being limited to these embodiments, and can be applied to various embodiments and combinations within a scope not deviating from the gist of the present disclosure.

The dedicated computer of the processing system 1 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

In the processing methods in the modifications, the processing of storing the warning information Iw in S103 and S113 may be omitted. In the processing methods in the modifications, the processing of storing the warning information Iw in S105 and S115 may be omitted. In the processing methods in the modifications, the mutual authentication processing in S100 and S110 may be omitted in the first embodiment according to the second embodiment.

The invention claimed is:

1. A processing method executed by a processor for performing a process related to a driving control of a host moving object that is configured to communicate with a target moving object, the processing method comprising:

setting a safety envelope of the target moving object within which a safety of an intended functionality is set with respect to the host moving object, wherein the safety envelope of the target moving object surrounds the target moving object;

setting a safety envelope of the host moving object within which a safety of an intended functionality is set with respect to the target moving object, wherein the safety envelope of the host moving object surrounds the host moving object;

acquiring warning information from the target moving object, the warning information warning of an envelope violation that is a violation of the safety envelope surrounding the target moving object caused by the host moving object; and adjusting the safety envelope surrounding the host moving object in response to acquiring the warning information.

2. The processing method according to claim 1, wherein adjusting the safety envelope includes adjusting the safety envelope with respect to the target moving object in response to acquiring the warning information when the host moving object does not recognize the envelope violation.

3. The processing method according to claim 2, further comprising:

monitoring the envelope violation based on a safety model that is defined by modeling the safety of the intended functionality, wherein adjusting the safety envelope further includes adjusting the safety envelope with respect to the target moving object by correcting the safety model when the host moving object does not recognize the envelope violation.

4. The processing method according to claim 1, wherein acquiring the warning information further includes acquiring the warning information for making a push notification of the envelope violation.

5. The processing method according to claim 1, wherein acquiring the warning information further includes acquiring the warning information to which envelope information related to the safety envelope set for the target moving object is added.

6. The processing method according to claim 1, further comprising:

storing the acquired warning information.

7. The processing method according to claim 1, further comprising:

generating feedback information for giving a feedback of acquisition of the warning information to the target moving object.

8. A processing system that is configured to execute a process related to a driving control for a host moving object that is configured to communicate with a target moving object, the system comprising at least one processor programmed to:

setting a safety envelope of the target moving object within which a safety of an intended functionality is set with respect to the host moving object, wherein the safety envelope of the target moving object surrounds the target moving object;

setting a safety envelope of the host moving object within which a safety of an intended functionality is set with respect to the target moving object, wherein the safety envelope of the host moving object surrounds the host moving object;

acquiring warning information from the target moving object, the warning information for warning of an envelope violation that is a violation of the safety envelope surrounding the target moving object caused by the host moving object; and adjusting the safety envelope surrounding the host moving object in response to acquiring the warning information.

9. A non-transitory, computer readable, tangible storage medium storing a processing program including instructions that cause at least one processor to execute a process related to a driving control of a host moving body that is configured to communicate with a target moving object, the instructions, when executed by the at least one processor, casing the at least one processor to:

set a safety envelope of the target moving object within which a safety of an intended functionality is set with respect to the host moving object, wherein the safety envelope of the target moving object surrounds the target moving object;

set a safety envelope of the host moving object within which a safety of an intended functionality is set with respect to the target moving object, wherein the safety envelope of the host moving object surrounds the host moving object;

acquire, from the target moving object, warning information for warning of an envelope violation that is a violation of the safety envelope surrounding the target moving object caused by the host moving object; and adjust the safety envelope surrounding the host moving object in response to acquiring the warning information.

\* \* \* \* \*